(12) United States Patent
Murakami et al.

(10) Patent No.: US 6,991,581 B2
(45) Date of Patent: Jan. 31, 2006

(54) CONTROL SYSTEM FOR HYBRID VEHICLES

(75) Inventors: Akira Murakami, Gotenba (JP); Yasunori Nakawaki, Nishikamo-gun (JP); Makoto Funahashi, Gotenba (JP); Masahiro Kojima, Okazaki (JP); Masatoshi Adachi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 19 days.

(21) Appl. No.: 10/781,781

(22) Filed: Feb. 20, 2004

(65) Prior Publication Data

US 2004/0220015 A1 Nov. 4, 2004

(30) Foreign Application Priority Data

Mar. 17, 2003 (JP) .................................... 2003-072588

(51) Int. Cl.
B60K 1/02 (2006.01)

(52) U.S. Cl. ........................................................ 477/3
(58) Field of Classification Search .................... 477/3, 477/5, 906, 907; 180/65–2
See application file for complete search history.

(56) References Cited

U.S. PATENT DOCUMENTS

| 3,623,568 A | 11/1971 | Mori | |
| 6,053,842 A * | 4/2000 | Kitada et al. | 477/5 |
| 6,098,733 A * | 8/2000 | Ibaraki et al. | 180/65.2 |
| 6,371,878 B1 | 4/2002 | Bowen | |
| 6,554,736 B2 * | 4/2003 | Takano et al. | 477/5 |

FOREIGN PATENT DOCUMENTS

| DE | 201 17 410 | 3/2002 |
| JP | 47-31773 | 8/1972 |
| JP | 7-71586 | 3/1995 |
| JP | 9-74607 | 3/1997 |
| JP | 9-284914 | 10/1997 |
| JP | 2001-289318 | 10/2001 |
| JP | 2002-225578 | 8/2002 |
| JP | 2003-49937 | 2/2003 |

OTHER PUBLICATIONS

U.S. Appl. 10/78,781, Murakami et al., filed Feb. 20, 2004.
U.S. Appl. 11/166,644, Endo et al., filed Jun. 27, 2005.

* cited by examiner

*Primary Examiner*—Dirk Wright
(74) *Attorney, Agent, or Firm*—Oblon, Spivak, McClelland, Maier & Neustadt, P.C.

(57) ABSTRACT

A control device for a hybrid vehicle, which has; a first prime mover and a second prime mover for transmitting a power to a wheel; a power distribution device for distributing the power of said first prime mover to the wheel and to a rotary device; a transmission arranged on a power transmission route from said second prime mover to the wheel; and a gear ratio control device for controlling a gear ratio of the transmission; characterized in that comprising a sub control device for controlling a status of said transmission to enable suppression of decline in a driving performance of the vehicle, even when the function of said gear ratio control mechanism declines.

20 Claims, 11 Drawing Sheets

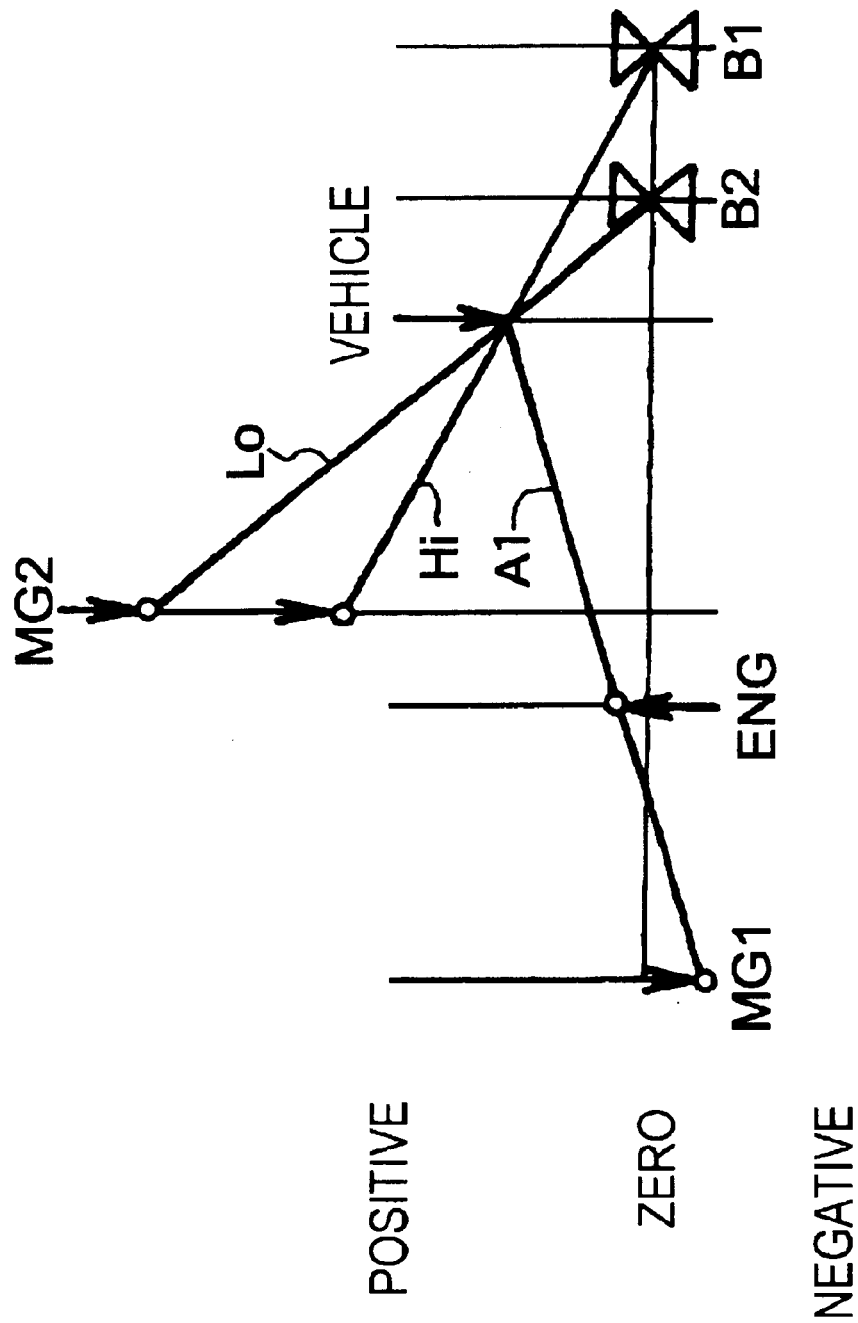

FIG.4

| RUNNING MODE | FAIL MODE | Sol1 (N/O) | Sol2 (N/C) | FS VALVE | B1 | B2 | CHANGE OF RUNNING MODE | LIMP HOME RUNNING MODE |
|---|---|---|---|---|---|---|---|---|
| NEUTRAL (N MODE) | NORMAL CONDITION | ○ | × | × | × | × | — | — |
| | Sol1 DISCONNECTED | ○→× | × | × | ×→○ | × | N→Hi | N MODE |
| | Sol2 DISCONNECTED | ○ | × | × | × | × | STAY AT N | N MODE |
| | ALL Sols DISCONNECTED | ○→× | × | × | ×→○ | × | N→Hi | N MODE |
| Lo MODE | NORMAL CONDITION | ○ | ○ | × | × | ○ | — | — |
| | Sol1 DISCONNECTED | ○→× | ○ | × | ×→○ | ○→× | Lo→Hi | Hi MODE |
| | Sol2 DISCONNECTED | ○ | ○→× | ×→○ | × | ○→× | Lo→N | Hi MODE |
| | ALL Sols DISCONNECTED | ○→× | ○→× | × | ×→○ | ○→× | Lo→Hi | Hi MODE |
| Hi MODE | NORMAL CONDITION | × | × | × | ○ | × | — | — |
| | Sol1 DISCONNECTED | × | × | × | ○ | × | STAY AT Hi | Hi MODE |
| | Sol2 DISCONNECTED | × | × | × | ○ | × | STAY AT Hi | Hi MODE |
| | ALL Sols DISCONNECTED | × | × | × | ○ | × | STAY AT Hi | Hi MODE |

FIG.5

| RUNNING MODE | FAIL MODE | Sol1 (N/O) | Sol2 (N/C) | FS VALVE | B1 | B2 | CHANGE OF RUNNING MODE | LIMP HOME RUNNING MODE |
|---|---|---|---|---|---|---|---|---|
| Lo MODE | NOMARL CONDITION | ◯ | ◯ | × | × | ◯ | — | — |
| | Sol1 DISCONNECTED | ◯→× | ◯ | ×STICK | ×→◯ | ◯ | Lo→TIE UP→Hi | Hi MODE |

FIG.8

| SPEED CHANGE MODE | Psol1 | Psol2 |
|---|---|---|
| NEUTRAL MODE (1) | REGION① | REGION② |
| NEUTRAL MODE (2) | REGION② | REGION① |
| Lo MODE | REGION① | REGION③ |
| Hi MODE | REGION③ | REGION① |
| Lo→Hi SPEED CHANGE PREPARING | REGION② | REGION③ |
| Hi→Lo SPEED CHANGE PREPARING | REGION③ | REGION② |
| SPEED CHANGING | REGION③ | REGION③ |
| NEUTRAL MODE (3) | REGION① | REGION① |

CONTROL SYSTEM FOR HYBRID VEHICLES

BACKGROUND OF THE INVENTION

1. Field of the Invention

This invention relates to a control system for a hybrid vehicle which has a plurality of prime movers.

The present invention relates to the subject matter contained in Japanese Patent Application No.2003-72588, filed on Mar. 17, 2003, which is expressly incorporated herein by reference.

2. Related Art

In recent year, there has been proposed a hybrid vehicle on which an engine for outputting a power by burning fuel and an electric motor generator for outputting a power by feeding it with an electric power are mounted, and which is capable of transmitting a power from the engine and the motor generator to wheels. In this kind of hybrid vehicle, the engine and the motor generator is controlled on the basis of various conditions so as to improve the fuel economy and to reduce the noise and the exhaust gas emission.

One example of the hybrid vehicle mounting a plurality of prime movers thereon as described above is disclosed in Japanese Patent Laid-Open No. 2002-225578. The disclosed hybrid vehicle has an engine and a second motor generator as the driving force source. Also, a planetary gear mechanism is arranged on a power transmission route between the engine and the second motor generator and the wheels. This planetary gear mechanism has a sun gear, ring gear, and a carrier supporting a pinion gear which meshes with the sun gear and the ring gear. This carrier and the engine are connected each other, and the ring gear is connected with the wheel and the second motor generator. Moreover, the first motor generator is connected with the sun gear. On the other hand, the speed change mechanism is provided on the power transmission route between the ring gear and the second motor generator. Furthermore, there are provided a shifting mechanism for interchanging the speed change mechanism between a low-state and a high-state, and an actuator for controlling the changing mechanism.

In the hybrid vehicle disclosed in above-mentioned publication, a power of at least one of the engine and the motor generator is transmitted through the planetary gear mechanism to the wheel. In case of transmitting a power of the second motor generator to the wheel, a control to change the speed change mechanism to the low-state or the high-state on the basis of a demand torque is executed. Here, a hybrid vehicle having an engine and a motor generator as a prime mover is also disclosed in Japanese Patent Laid-Open No. 9-74607. Moreover, one example of a hydraulic control apparatus for an automatic transmission is disclosed in Japanese Patent Laid-Open No. 7-71586.

According to the invention disclosed in the above-mentioned Laid-Open No.2002-225578, however, there is no description about how to control the speed change mechanism in case of function decline occurs in the actuator for changing the speed change mechanism to the low-state or the high-state. Accordingly, there is room for improvement with respect to this point.

SUMMARY OF THE INVENTION

An object of this invention is to provide a control system for a hybrid vehicle, which can suppress functional decline in driving performance of the vehicle, even when a function of a gear ratio control mechanism for controlling the gear ratio of a transmission declines.

In order to achieve the above-specified object, according to the present invention, there is provided a control system for a hybrid vehicle, which has; a first prime mover and a second prime mover for transmitting a power to wheels; a power distribution device for distributing the power of said first prime mover to the wheels and a rotary device; a transmission arranged on a power transmission route from said second prime mover to the wheels; and a gear ratio control mechanism for controlling a gear ratio of the transmission; comprising, a control device for controlling a status of the transmission to enable suppression of decline in a driving performance of the vehicle even when the function of said gear ratio control mechanism declines.

According to the invention, therefore, the power of at least one of the first prime mover and the second prime mover is transmitted to the wheels. Also, the power of the first prime mover is possible to be distributed to the wheels and the rotary device. And a status of the transmission is controlled so as to enable suppression of the decline in the driving performance of the vehicle in case the function of the gear ratio control device declines.

In the invention, said control device further comprises a function to set the gear ratio smaller than the maximum gear ratio as the gear ratio of said transmission, in addition to the above construction.

According to the invention, therefore, the gear ratio smaller than the maximum gear ratio is set as the gear ratio of said transmission, in case the function of the gear ratio control device declines.

In addition to any of the above constructions, according to the present invention, there is provided a control system for a hybrid vehicle; wherein said transmission has a first functional engagement device and a second frictional engagement device; wherein the first frictional engagement device and the second frictional engagement device are applied/released by an oil pressure fed from said gear ratio control device; wherein said transmission further has a function to apply said second frictional engagement device and to release said first frictional engagement device in case said gear ratio control device functions properly and sets a first gear ratio as a maximum gear ratio, and a function to apply said first functional engagement device and to release said second frictional engagement device in case said gear ratio control device functions properly and sets a second gear ratio smaller than the first gear ratio; and wherein said control device further comprises a function to set the gear ratio smaller than the maximum gear ratio as the gear ratio of said transmission, by means of releasing the second frictional engagement device with lowering the oil pressure to be transmitted to said second frictional engagement device, when said first frictional engagement device is applied because of the decline in function of said gear ratio control device in case of setting the maximum gear ratio.

According to the invention, therefore, the oil pressure to be transmitted to the second frictional engagement device is lowered and the second frictional engagement device is released, when the first frictional engagement device is applied because of decline in function of the gear ratio control device in case of setting the first gear ratio.

In addition to the construction mentioned first, according to the invention, there is provided a control system for a hybrid vehicle, comprising: the first frictional engagement device and the second frictional engagement device applied/released by the oil pressure transmitted thereto in case of setting the first or second gear ratio in said transmission; and a control oil pressure generation valve for generating a predetermined control oil pressure in accordance with a signal pressure; wherein said gear ratio control device has a function to generate an oil pressure to be transmitted to said first and second frictional engagement device by regulating the control oil pressure generated by said control oil pressure generation valve; and a selector valve for selecting any of the oil pressure regulated by said gear ratio control device and the control oil pressure generated by said control oil pressure generation valve as the signal pressure.

According to the invention, therefore, the first or second gear ratio is set in the transmission, by generating the control oil pressure by the control oil pressure generation valve, by regulating the control oil pressure again by the gear ratio control device, and by feeding the regulated oil pressure to the first and second frictional engagement device, in addition to the action identical to that of the construction mentioned first. Moreover, any of the oil pressure regulated by the gear ratio control device, and the control oil pressure generated by the control oil pressure generation valve, is selected as the signal pressure of the control oil pressure generation valve.

In addition to the construction mentioned above, according to the invention, there is provided a control system for a hybrid vehicle, wherein said selector valve further comprising: a function to select the oil pressure to be transmitted to said second frictional engagement device as said signal pressure, in case of setting the first gear ratio with raising the oil pressure to be transmitted to said second frictional engagement device and with lowering the oil pressure to be transmitted to said first frictional engagement device; a function to select the oil pressure to be transmitted to said first frictional engagement device as said signal pressure, in case of setting the second gear ratio with raising the oil pressure to be transmitted to said first frictional engagement device and with lowering the oil pressure to be transmitted to said second frictional engagement device; and a function to select the control oil pressure generated by the control oil pressure generation valve as said signal pressure, in case of interchanging between said first and second gear ratio.

According to the invention, therefore, the oil pressure to be transmitted to the second frictional engagement device is selected as the signal pressure, in case of setting the first gear ratio with raising the oil pressure to be transmitted to the second frictional engagement device and with lowering the oil pressure to be transmitted to the first frictional engagement device. On the other hand, the oil pressure to be transmitted to the first frictional engagement device is selected as the signal pressure, in case of setting the second gear ratio with raising the oil pressure to be transmitted to the first frictional engagement device and with lowering the oil pressure to be transmitted to the second frictional engagement device.

Moreover, the control oil pressure generated by the control oil pressure generation valve is selected as the signal pressure, in case of interchanging between the first and second gear ratio.

According to the invention, there is provided a control system for a hybrid vehicle, wherein said selector valve further comprises a function to control the signal pressure to be inputted to said control oil pressure generation valve lower than a predetermined oil pressure, in case of having said transmission impossible to transmit the torque.

According to the invention, therefore, the signal pressure to be inputted to the control oil pressure generation valve is controlled to be lower than the predetermined oil pressure, in case of having said transmission impossible to transmit the torque, in addition to the action identical to that of the construction mentioned first.

In addition to the construction mentioned above, according to the invention, there is provided a control system for a hybrid vehicle, wherein an oil outputted by said gear ratio control device is fed through said selector valve to said first and second frictional engagement device, and wherein said selector valve is constructed to feed the oil outputted by said gear ratio control device to said first and second frictional engagement device, when it is possible to transmit the oil outputted by said gear ratio control device to said control oil generation valve as said signal pressure. Here, the definition of "feeding the oil to the first and second frictional engagement device" does not necessarily imply a temporal oil feeding method or a timing of the oil feeding such as "feeding the oil to the first and second frictional engagement device simultaneously or collaterally".

According to the invention, therefore, the oil outputted by the gear ratio control device is fed to the first or second frictional engagement device, in case it is possible to transmit the oil pressure outputted by the gear ratio control device to the control oil pressure generation valve as the signal pressure, in addition to the action identical to that of the construction mentioned first.

In addition to any of the construction mentioned above, moreover, according to the invention, there is provided a control system for a hybrid vehicle, wherein said selector valve further comprises a function to suppress reduction of amount of a lubricating oil to be fed to said first and second frictional engagement device, in case of interchanging between the first and second gear ratio in said transmission.

According to the invention, therefore, reduction of amount of the lubricating oil to be fed to the first and second frictional engagement device is suppressed in case of interchanging the first and second gear ratio in said transmission, in addition to any of the action identical to that of the construction mentioned above.

Furthermore, the present invention can be constructed as a control method to execute any of controls by the above-described individual construction.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

BRIEF DESCRIPTION OF THE DRAWINGS

FIG. 3 is a speed diagram showing a status of rotary members of the vehicle shown in FIG. 2;

FIG. 4 is a table showing a status of the hydraulic circuit system shown in FIG. 1;

FIG. 5 is a table showing a status of the hydraulic circuit system shown in FIG. 1;

FIG. 8 is a table showing a relation between a speed change mode and an output oil pressure of a linear solenoid valve in the embodiment of this invention;

BEST MODE FOR CARRYING OUT THE INVENTION

Figure 2:
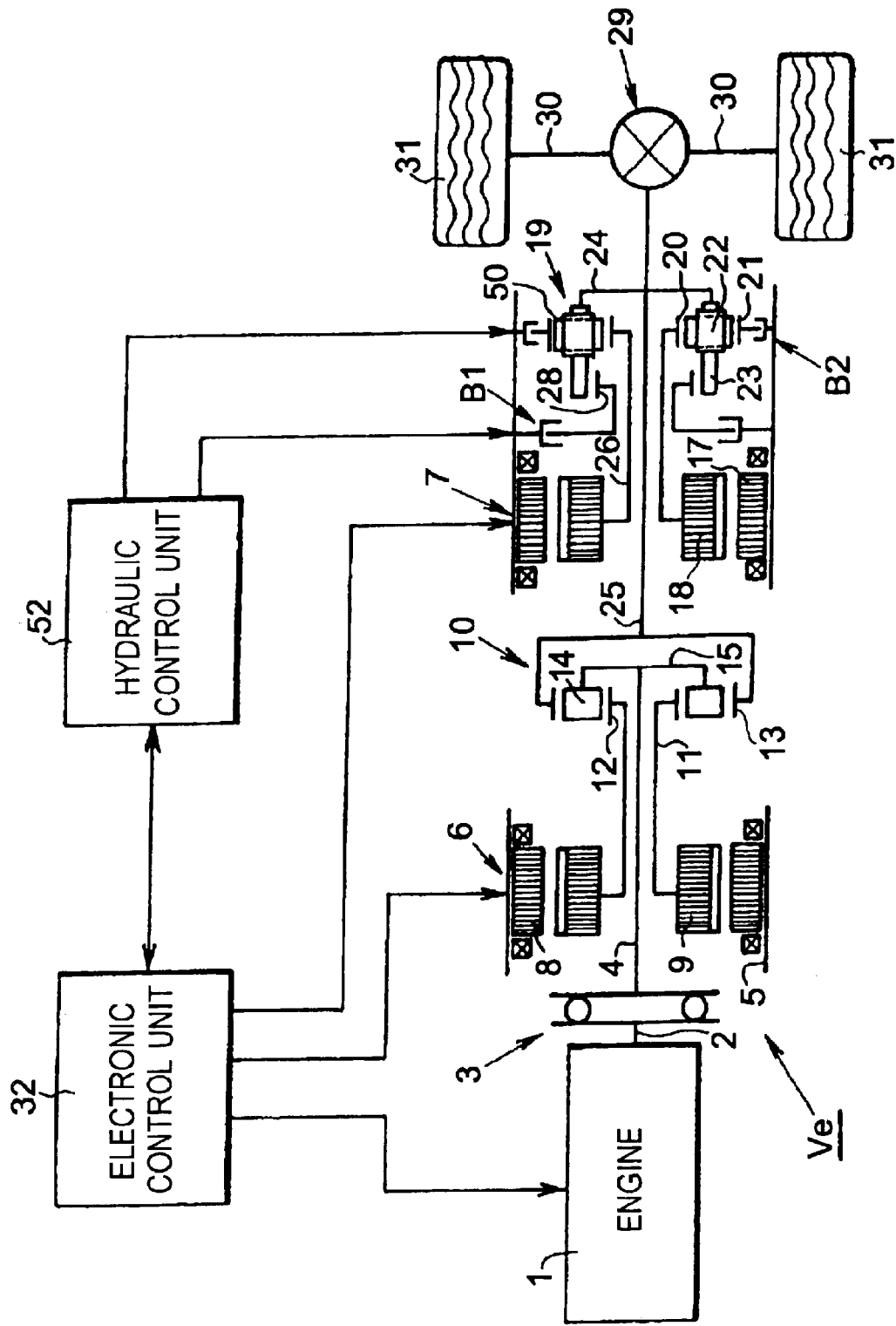
FIG. 2 is a conceptional diagram showing a power train and a control line of a hybrid vehicle having a control device of this invention.

Next, this invention will be specifically described with reference to the accompanying drawings. FIG. 2 shows one example of a vehicle Ve on which a control device of this invention can be applied. The vehicle Ve shown in FIG. 2 is an F-R (i.e., front engine rear drive) type vehicle. In FIG. 2, the vehicle Ve has an engine as a first prime mover.

An internal combustion engine, specifically, a gasoline engine, a diesel engine, or LPG engine or the like can be employed as said engine 1. An input shaft 4 is connected through a dumper mechanism 3 to a crankshaft 2 of the engine 1. Also, there is provided a casing 5, and motor generators 6 and 7 are arranged therein. A motor generator, which has a power mode function to convert an electric energy into a mechanical energy and a regenerating function to convert the mechanical energy into the electric energy, can be employed as the motor generators 6 and 7. The motor generator 6 has a stator 8 and a rotor 9, and the stator 8 is fixed to the casing 5.

Moreover, there is provided a power distribution device 10 in the casing 5. This power distribution device 10 comprises a single pinion type planetary gear mechanism. Specifically, the motive power distribution device 10 has a sun gear 12 formed on a hollow shaft 11, a ring gear 13 arranged concentrically with the sun gear 12, and a carrier 15 which holds a pinion gear 14 meshing with the sun gear 12 and the ring gear 13. The input shaft 4 and the carrier 15 are connected to rotate integrally. Also, the input shaft 4 is arranged in the hollow shaft 11, and the input shaft 4 and the hollow shaft Hare capable of rotating relatively. The rotor 9 of the motor generator 6 is connected to the hollow shaft 11.

On the other hand, said motor generator 7 has a stator 17 and a rotor 18, and the stator 17 is fixed to the casing 5. Also, a transmission 19 is provided in the casing 5. This transmission 19 is a planetary gear type transmission. Specifically, the transmission 19 has a sun gear 20 and a ring gear 21 arranged concentrically, a diametrically large pinion gear 22 and a diametrically small pinion gear 23 rotating integrally, a short pinion gear 50, and a carrier 24 which holds the diametrically large pinion gear 22, the diametrically small pinion gear 23, and the short pinion gear 50 integrally revolutionable. The short pinion gear 50 meshes with the sun gear 20 and the ring gear 21. Also, the diametrically large pinion gear 22 meshes with the short pinion gear 50. Moreover, there is provided another sun gear 28 meshing with the diametrically small pinion gear 23, adjacent to said sun gear 20 on a coaxial line. Specifically, the transmission 19 comprises a ravigneaux type planetary gear mechanism. Besides, the transmission 19 can also be constructed of a complex structured planetary gear mechanism composed of a plurality of sets of planetary gear mechanisms such as, e.g., a single pinion type planetary gear mechanism and a double pinion type planetary gear mechanism and etc.

An output shaft 25 is connected to the carrier 24 integrally rotatable, and the input shaft 4 and the output shaft 25 are arranged concentrically. Also, the output shaft 25 and the ring gear 13 of the power distribution device 10 are connected integrally rotatable. A hollow shaft 26 is arranged outside of the output shaft 25, and the output shaft 25 and the hollow shaft 26 are capable of rotating relatively. This hollow shaft 26 and the rotor 18 of the motor generator 7 are connected to rotate integrally.

Also, the hollow shaft 26 and the sun gear 20 are connected to rotate integrally. Moreover, there is provided a brake B1 for allowing or restricting a rotation of the sun gear 28. Furthermore, there is provided a brake B2 for allowing or restricting a rotation of the ring gear 21. Here, the output shaft 25 and an input member (not shown) of a deferential 29 are connected through a propeller shaft (not shown). Also, a rotary member (not shown) of the deferential 29 is connected to a drive shaft 30. Moreover, a wheel 31 is connected to a drive shaft 30. Thus, the engine 1 and the motor generator 7 are connected to the same wheel 31 in a power transmitting manner, being arranged in parallel with each other.

Next, a control system of the vehicle Ve will be described hereinafter. There is provided an electronic control unit 32, into which a signal to indicate a demand for starting/stopping of the engine 1, a control demand signal of the motor generators 6 and 7, a shift position selecting signal, a signal to indicate a vehicle speed, a signal to indicate an acceleration demand, a signal to indicate an breaking demand, a signal to indicate an engine speed, a signal to indicate a status of a hydraulic control apparatus 52 and so on are inputted. As for shift positions detected by a shift position sensor, for example, there are P (parking) position, R (reverse) position, N (neutral) position, and D (drive) position. Here, the P position and the N position are selected in case of having the transmission impossible to transmit the torque (i.e., a non-driven state, or a non-driving state), and the D position and the R position are selected in case of having the transmission possible to transmit the torque (i.e., a driven state, or a driving state).

On the other hand, a signal to control the engine 1, a signal to control the motor generator 6, a signal to control the motor generator 7, a signal to control the hydraulic control apparatus 52 and so on are outputted from the electronic control unit 32. Concerning the hydraulic control apparatus 52, it will be described later. And, the brakes B1 and B2 are applied/released in accordance with the oil pressure transmitted from the hydraulic control apparatus 52 to the brakes B1 and B2.

When the engine 1 is being halted, in the vehicle Ve shown in FIG. 2, the engine 1 is allowed to rotate autonomously by feeding and combusting, fuel while cranking the engine 1 with transmitting the torque of the motor generator 6 to the engine 1 by driving the motor generator 6 as an electric motor on the basis of the signal inputted into the electronic control unit 32 and data stored in the electronic control unit 32.

Also, in the vehicle Ve, a driving mode is selectively interchangeable from a first driving mode to a third driving mode by a combination of driving and halting of a plurality of prime movers. In case the first driving mode is selected, the engine 1 is driven and feeding of the electric power to the motor generator 7 is suspended. In case the engine 1 is rotating autonomously, an engine torque is transmitted to the output shaft 25 through the input shaft 4, the carrier 15, and the ring gear 13. The torque of the output shaft 25 is transmitted to the wheel 31 through the propeller shaft (not shown), the deferential 29, and the drive shaft 30, and as a result, a driving force is generated. Here, it is possible to store the electric power in an accumulator device (not shown), by operating the motor generator 6 as the motor generator with transmitting the engine torque through the motive power distribution device 10 to, and with operating 6.

In case the second driving mode is selected, on the other hand, the motor generator 7 is driven as the electric motor, and the torque of the motor generator 7 is transmitted to the wheel 31 through the transmission 19. In case the second driving mode is selected, the fuel is not fed to the engine 1.

In case the third driving mode is selected, moreover, the engine 1 and the motor generator 7 are driven together, and the torques of the engine 1 and the motor generator 7 are transmitted together to the wheel 31. Thus, it is possible to mechanically distribute the engine torque to the wheel 31 and the motor generator 6 by the power distribution device 10. In addition to say, the vehicle Ve shown in FIG. 2 is a hybrid vehicle which is capable of operating at least one of the engine 1 and the motor generator 7 as the prime mover.

Beside, in case of transmitting the torque of the motor generator 7 to the wheel 31, two kinds of speed change mode are selectable as a mode to control the transmission 19. This shifting mode is judged on the basis of the vehicle speed, demand driving force and so on, and it is possible to select any of a low-speed mode and a high-speed mode. For example, in case the vehicle speed is lower than the predetermined speed and the drive demand force is higher than the predetermined value, the low-speed mode is selected. On the contrary, in case the vehicle speed exceeds the predetermined speed and the drive demand is lower than the predetermined value, the high-speed mode is selected.

In case the low-speed mode is selected, the brake B1 is released and the brake B2 is applied. When this low-speed mode is selected and the torque of the motor generator 7 is transmitted to the sun gear 20, the ring gear 21 functions as a reaction element and the torque of the sun gear 20 is transmitted to the wheel 31 through the carrier 24, the output shaft 25, and the deferential 29. Here, the speed of the motor generator 7 is reduced by the transmission 19. Besides, the gear ratio of the transmission 19 of the case in which the low-speed mode is selected is "low (maximum gear ratio)".

In case the high-speed mode is selected, on the other hand, the brake B2 is released and the brake B1 is applied. In case the motor generator 7 is driven as the electric motor and the high-speed mode is selected, the sun gear 28 functions as a reaction element and the torque of the sun gear 20 is transmitted to the wheel 31 through the carrier 24, the output shaft 25, and the deferential 29. Specifically, the speed of the motor generator 7 is reduced by the transmission 19. Besides, the gear ratio of the transmission 19 of the case in which the high-speed mode is selected is "high (small gear ratio)". The gear ratio of the case in which the high-speed mode is selected is smaller than that of the case in which the low-speed mode is selected.

Here, one example of a rotation speed and a rotation direction of individual rotary element of the power train shown in FIG. 2 will be described with reference to the speed diagram of FIG. 3. The speed diagram of FIG. 3 shows a case in which the engine 1 and the motor generator 7 are driven together, the engine torque is transmitted to the output shaft 25, and the torque of the motor generator 7 is transmitted to the output shaft 25. Specifically, a relation among the engine 1, the motor generator 6, and the output shaft 25 is indicated by a segment Al, and a relation among the motor generator 7, the output shaft 25, the sun gear 28, and the ring gear 21 is indicated by a segment Lo and a segment Hi. The segment Lo corresponds to the case in which the gear ratio is set to "low" in the transmission 19, and the segment Hi corresponds to the case in which the gear ratio is set to "high" in the transmission 19.

In FIG. 3, "MG1" represents the rotation speed of the motor generator 6; "MG2" represents the rotation speed of the motor generator 7; "ENG" represents the engine speed; "VEHICLE" represents the rotation speed of the output shaft 25; "B1" represents the rotation speed of the sun gear 28 halted by the brake B1; and "B2" represents the rotation speed of the ring gear 21 halted by the brake B2. As shown in FIG. 3, the engine 1 rotates forward and the output shaft 25 also rotates forward. Because the engine speed is increased by the power distribution device 10, the rotation speed of the output shaft 25 becomes higher than the engine speed. Also, the rotation speed of the motor generator 7 is reduced by the transmission 19 in either case in which the gear ratio "high" or "low" is selected. An example of the hydraulic control apparatus 52 will be described in due course hereinafter.

Here will be described a first embodiment of the hydraulic control apparatus 52 with reference to FIG. 1. First of all, there are provided oil pumps 53 and 54. The oil pump 53 is driven by the engine 1, and the oil pump 54 is driven by the motor. And, the oil reserved in an oil pan 55 is pumped by at least one of the oil pumps 53 and 54. Moreover, there is provided a primary regulator valve 56 to which the oil discharged from the oil pumps 53 and 54 is to be fed. The primary regulator valve 56 comprises, a spool 58 which is applied an energizing force in a predetermined direction by an elastic member 57, a passage (i.e., a port) 59, ports 60, 61, 62, and a hydraulic chamber 63.

The oil discharged from the oil pumps 53 and 54 is fed through an oil passage 64 to the passage 59. An oil passage 65 is communicated with the passage 59, and the oil pressure of the oil passage 65 is transmitted to a port (i.e., a feed back port) 60. An energizing force corresponding to the oil pressure of the port 60 and an energizing force corresponding to an elastic force of the elastic member 57 act on the spool 58 oppositely each other, and the spool 58 moves in accordance with the relation between those energizing forces. The amount of the oil fed from the oil passage 64 to oil passage 65, and the amount of the oil discharged from the passage 59 to the ports 61 and 62 are regulated by the operation of the spool 58. Here, the oil discharged from the port (i.e., a drain port) 61 is returned through the oil passage 66 to a suction inlet of the oil pumps 53 and 54. Also, the oil discharged from the port 62 is returned through the oil passage 67 to a discharging outlet of the oil pumps 53, alternatively, returned through the oil passages 67 and 98, and a cooler 99 to the oil pan 55. Specifically, the oil pressure appears on the passage 59 is regulated to the pressure (i.e., a line pressure) corresponding to the energizing force composed of the oil pressure of the hydraulic chamber 63 and the energizing force of the elastic member 57.

The oil of said oil passages 65 is fed to a linear solenoid valve SLT. The linear solenoid valve SLT comprises, a spool (not shown) capable of reciprocating in a predetermined direction, an electromagnetic coil (not shown) for applying the energizing force to the spool in the forward direction, an elastic member (not shown) for applying the energizing force to the spool in the backward direction, and ports 68, 69, 70, 71, and 72. The port 69 and said hydraulic chamber 63 are communicated through an oil passage 73, and the port 70 is communicated with the oil pan 55. Also, the port 71 and the port 72 are communicated.

In the linear solenoid valve SLT, movement of the spool is controlled on the basis of a relation between a magnetic attractive power generated by energizing the electro magnetic coil, and the energizing force corresponding to the oil pressure of the port 72 and the energizing force of the elastic member, so as to adjust an opening area between the ports 68 and 69, 71, and the opening area between the ports 69 and 70.

This linear solenoid valve SLT is a normal open type valve having a function such that the opening area between the ports 68 and 69, 71 becomes maximum, and the opening area between the ports 69 and 70 becomes minimum, in case the electromagnetic coil is not energized (i.e., in case of OFF). According to the linear solenoid valve SLT, an output pressure is reduced in response to an increase of an electromagnetic force depending on a current, therefore, the lower the current becomes, the higher the oil pressure of the oil passage 73 and the hydraulic chamber 63 becomes. Specifically, pressure regulating level of the primary regulator valve 56 becomes higher.

On the other hand, the oil of the oil passage 65 is fed through an oil passage 74 to linear solenoid valves SL1 and SL2. The linear solenoid valve SL1 comprises, a spool (not shown) capable of reciprocating in a predetermined direction, an electromagnetic coil (not shown) for applying the energizing force to the spool in the forward direction, an elastic member (not shown) for applying the energizing force to the spool in the backward direction, and ports 75, 76, 77, 78, and 79. Also, there is formed an oil passage 100 for communicating the port 79 with the oil pan 55. Moreover, port 76 and the port 77 are communicated each other. Furthermore, a hydraulic chamber 81 of the brake B1 is communicated through an oil passage 80 with the port 78.

In the linear solenoid valve SL1, movement of the spool is controlled on the basis of a relation between a magnetic attractive power generated by energizing the electromagnetic coil, and the energizing force corresponding to the oil pressure of the port 77 and the energizing force of the elastic member, so as to adjust the opening area between the ports 75 and 76, 78, and the opening area between the ports 78 and 79.

This linear solenoid valve SL1 is a normal open type valve having a function such that the opening area between the ports 75 and 76, 78 becomes maximum, and the opening area between the ports 78 and 79 becomes minimum, in case the electromagnetic coil is not energized (i.e., in case of OFF). Therefore, the output oil pressure of the oil passage 80 becomes a maximum pressure when the linear solenoid valve SL1 is not energized. The relation between the energizing current to the electromagnetic coil of the linear solenoid valve SLT and the oil pressure of the oil passage 80 is thus can be proportionally controlled. Specifically, the linear solenoid valve SL1 is a solenoid valve in which the output pressure is lowered by increasing an electromagnetic force depending on the current.

On the other hand, a linear solenoid valve SL2 comprises, a spool (not shown) capable of reciprocating in a predetermined direction, an electromagnetic coil (not shown) for applying the energizing force to the spool in the forward direction, an elastic member (not shown) for applying the energizing force to the spool in the backward direction, and ports 82, 83, 84, and 85. The port 82 and the oil passage 74 are communicated each other, and the port 85 is communicated with the oil pan 55 through an oil passage 100. Also, the port 83 and the port 84 are communicated each other, and moreover, the port 83 and an oil passage 86 are communicated each other.

In the linear solenoid valve SL2, movement of the spool is controlled on the basis of a relation between the energizing force corresponding to the magnetic attractive power generated by energizing the electro magnetic coil, and the energizing force corresponding to the energizing force of the elastic member and the oil pressure of the port 84, so as to adjust the opening area between the ports 82 and 83, and the opening area between the ports 83 and 85.

This linear solenoid valve SL2 is a normal close type valve having a function such that the opening area between the ports 82 and 83 becomes minimum, and the opening area between the ports 83 and 85 becomes maximum, in case the electromagnetic coil is not energized (i.e., in case of OFF). Accordingly, the output oil pressure of the oil passage 86 becomes maximum pressure when the energizing current of the linear solenoid valve SL2 becomes maximum. The relation between the energizing current to the electromagnetic coil of the linear solenoid valve SL2 and the oil pressure of the oil passage 86 is thus can be proportionally controlled. Specifically, the linear solenoid valve SL2 is a solenoid valve in which the output pressure is increased by increasing the electromagnetic force depending on the current.

Moreover, a fail-safe valve 88 is provided on the passage between the oil passage 86 and an oil chamber 87 of the brake B2. This fail-safe valve 88 comprises, a spool 89 capable of moving in a predetermined direction, and ports 90, 91, 92, 93, 94, and 97. The ports 90 and 93 are communicated with the oil passage 86, and the oil chamber 87 is communicated with the port (i.e., an output port) 91 through an oil passage 95. Also, the port (i.e., a control port) 94 and the oil passage 74 are communicated through an oil passage 96, and the port (i.e., a drain port) 92 is communicated with the oil pan 55. Moreover, the port (i.e., the control port) 97 is communicated with the oil passage 80. Furthermore, there is provided an elastic member 98 for applying the energizing force to the spool 89 in one direction, and the spool 89 moves on the basis of the corresponding relation among the energizing force of the elastic member 98, the energizing force corresponding to the oil pressure of the ports 93 and 97, and the oil pressure corresponding to the port 94. The amount of the oil fed from the port (i.e., an input port) 90 to the port 91, and the amount of the oil discharged from the port 91 to the port 92 are regulated by the movement of the spool 89. Specifically, the output port 91 is communicated alternatively with the input port 90 and with the drain port 92.

Figure 1:
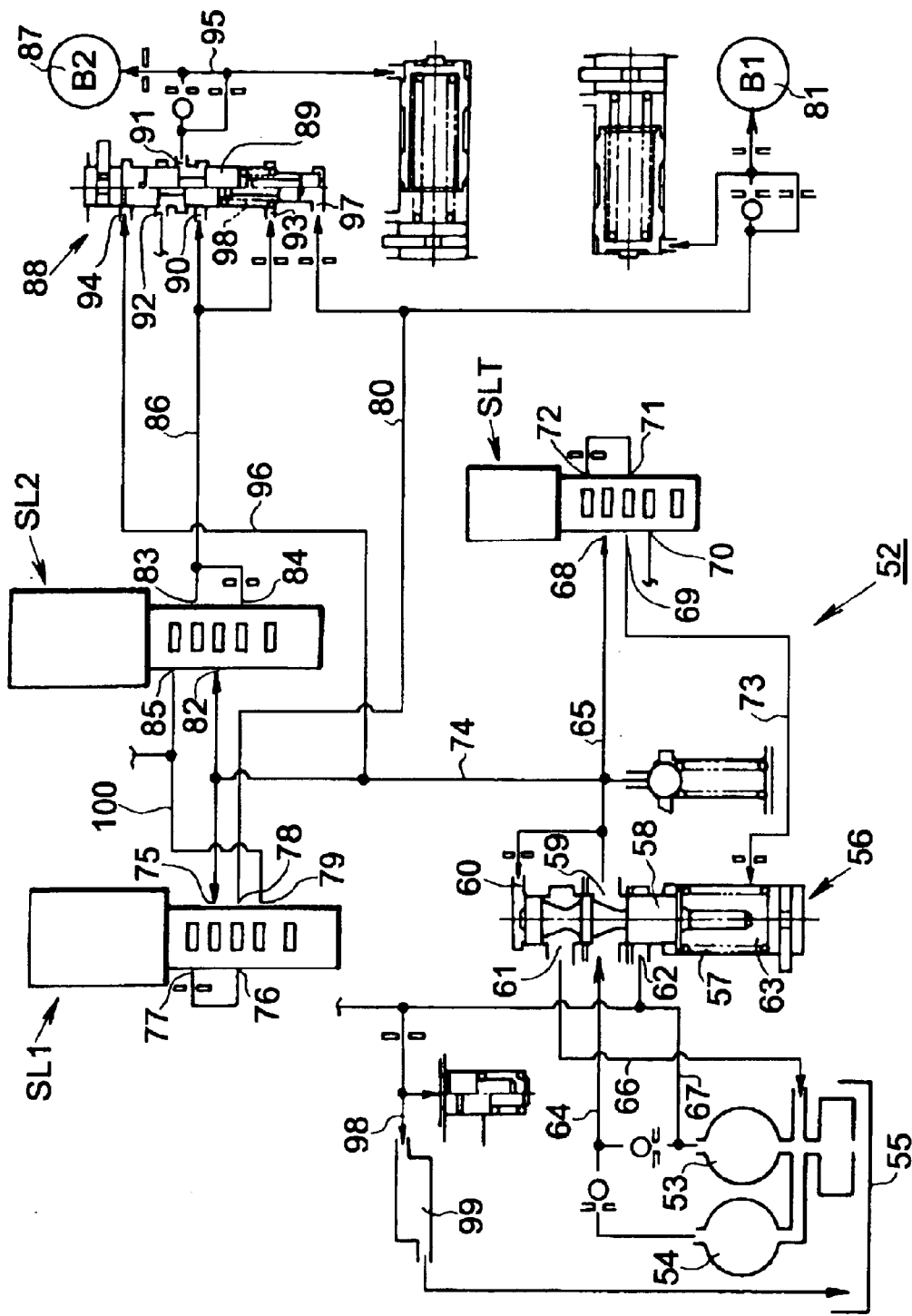
FIG. 1 is a hydraulic circuit diagram showing a first example of a control device of this invention.

Next, here will be specifically described a function i.e., a control method according to this invention of the hydraulic control apparatus 52 shown in FIG. 1. First of all, oil discharged from at least one of the oil pumps 53 and 54 is fed to the oil passage 64. An oil pressure of the hydraulic chamber 63 is controlled in accordance with the energizing current to the linear solenoid valve SLT. Moreover, the spool 58 moves to control the oil pressure (i.e., a line pressure) of the oil passage 65, in accordance with the energizing force corresponding to the oil pressure of the hydraulic chamber 63, the energizing force of the elastic member 57, and the energizing force corresponding to the oil pressure of the port 60. In short, the primary regulator valve 56 regulates the line pressure on the basis of the oil pressure from the oil passage 73 communicated with the linear solenoid valve SLT as a pilot pressure. The relation between the energizing current to the electromagnetic coil of the linear solenoid valve SLT and the oil pressure of the oil passage 65 is thus can be proportionally controlled. The oil of the oil passage 65 is fed through the oil passage 74 to the port 75 of the linear solenoid valve SL1 and the port 82 of the linear solenoid valve SL2.

In case the high speed mode is selected, first of all, the oil pressure of the oil passage 80 (i.e., the output pressure of the linear solenoid valve SL1) is raised to increase the oil pressure of the hydraulic chamber 81 in the linear solenoid valve SL1 by controlling the energizing current to the electromagnetic coil, and the applying pressure of the brake B1 is accordingly increased.

The oil of said oil passage 80 is also fed to the port 97 of the fail-safe valve 88. And in case the brake B1 is applied, in other words, in case the oil pressure of the oil passage 80 is increasing, the spool 89 moves up in FIG. 1 to reduce the opening area between the ports 90 and 91, and to enlarge the opening area between the ports 91 and 92. Specifically, in case the total of: a force to push up the spool 89 to the upside of FIG. 1 also on the basis of the applying pressure of the brake B1 acting on the port 97; a force to jack up the spool 89 to the upside of FIG. 1 also on the basis of the applying pressure of the brake B2 acting on the port 93; and an elastic force of a spring 93; exceeds a force to push down the spool 89 to downward of FIG. 1 on the basis of the line pressure acting on the port 94, the spool 89 moves up. As a result of this, the output port 91 is communicated with the drain port 92 instead of the input port 90. Therefore, the oil of the hydraulic chamber 87 of the brake B2 drains through the oil passage 95 and the port 92, so that the oil pressure of the hydraulic chamber 87 decreases, and the applying pressure of the brake B2 decreases. Additionally, in case the high mode is selected, the oil of the oil passage 86 is drained from the port 85 by controlling the energizing current of the linear solenoid valve SL2. Consequently, the oil pressure of the port 93 of the fail-safe valve 88 becomes low level.

On the other hand, in case the low speed mode is selected, the oil of the hydraulic chamber 81 of the brake B2 is drained by controlling the energizing current of the linear solenoid valve SL1, and the applying pressure of the brake B1 decreases. Also, in the linear solenoid valve SL2, the output oil pressure is increased by controlling the energizing current to the electromagnetic coil.

Moreover, is case the brake B1 is released, in other words, in case the oil pressure of the oil passage 80 decreases, the oil pressure acting on the control port 93 of the fail-safe valve 88 decreases so that the spool 89 moves downward of FIG. 1, and the output port 91 communicates with the input port 90. Therefore, the oil fed from the oil passage 74 to the oil passage 86 is fed to the hydraulic chamber 87 through the oil passage 95, and the oil pressure of the hydraulic chamber 87 increases so that the applying pressure of the brake B2 is increased. Accordingly, an interchanging of the low speed mode and the high speed mode, in other words, in case of executing a speed change control of the transmission 19, so-called "clutch-to-clutch shift", in which a control to change applying/releasing state of any one of the brakes and a control to change applying/releasing state of another brake are executed simultaneously, is executed.

FIGS. 4 and 5 are tables showing statuses of the hydraulic control apparatus 52 corresponding to all kinds of running modes. In FIG. 4, "neutral mode" represents that "it is impossible to transmit the torque between the motor generator 7 and the output shaft 25", "Lo mode" represents that "the low speed mode is selected", and "Hi mode" represents that "the high speed mode is selected". Also, "fail mode" represents the propriety of the function of the hydraulic control apparatus 52. In FIGS. 4 and 5, "Sol1" represents the linear solenoid valve SL1, "Sol2" represents the linear solenoid valve SL2, "(N/O)" represents the normal open type, and "(N/C)" represents the normal close type.

In FIGS. 4 and 5, moreover, there are presented "normal condition", "Sol 1 disconnection", "Sol 2 disconnection", and "all Sol disconnection" as patterns of fails. Here, "Sol 1 disconnection", represents that "a wire for feeding an electric power to the linear solenoid valve SL1 is disconnected", "Sol 2 disconnection" represents that "a wire for feeding an electric power to the linear solenoid valve SL2 is disconnected", and "all Sol disconnection" represents that "a wire for feeding an electric power to the linear solenoid valves SL1 and SL2 is disconnected".

Also, "○" corresponding to "Sol1" and "Sol2" represents the energization of the linear solenoid valves, and "X" corresponding to "Sol 1" and "Sol 2" represents the non-energization of the linear solenoid valves. Moreover, "FS valve" represents the fail-safe valve 88, and "X" corresponding to "FS valve" represents that the spool 89 of the fail-safe valve 88 stops at the left side position of the axis shown in FIG. 1. Specifically, this means that the port 90 and the port 91 are cut off, and the port 91 and the port 92 are communicated each other.

Moreover, "○" corresponding to "FS valve" represents that the spool 89 of the fail-safe valve 88 stops at the right side position of the axis shown in FIG. 1. Specifically, this means that the port 90 and the port 91 are communicated each other, and the port 91 and the port 92 are cut off. Also, "B1" represents the brake B1, and "B2" represents the brake B2. Moreover, "X" corresponding to "B1" and "B2" represents that the brakes are released, and "○" corresponding to "B1" and "B2" represents that the brakes are applied.

Each mode will be described in detail hereinafter. First of all, contents of FIG. 4 will be described.

[In Case the Neutral Mode is Selected]

① In case the hydraulic control apparatus 52 is in a normal condition:

Sol1 is energized and Sol2 is notenergized. Also, FS valve is "X". In short, both of brakes B1 and B2 are "X". Also, change of the running mode does not occur, and a limp home running mode also does not exist.

② In case of disconnection of Sol1:

Sol1 turns to a non-energizing status from an energizing status, and the brake B1 turns to an applied status from a released status. As a result, the running mode turns to the Hi mode from the neutral mode. In this connection, the limp home running mode is made to be equal to the driving mode of the neutral mode by controlling the speed of the motor generator (MG2) 7 in accordance with the vehicle speed. Specifically, the torque transmitted from the motor generator 7 to the output shaft 25 is controlled at zero.

③ In case of disconnection of Sol2:

Status of individual system is same as aforementioned case ①.

The running mode stays in the neutral mode, and the limp home running mode also stays in the neutral mode.

④ In case of disconnection of all Sols:

Status of individual system is same as aforementioned case ②.

The running mode stays in the neutral mode, and the limp home running mode is also equal to the driving mode of the neutral mode.

[In Case the Lo Mode is Selected]

① In case the hydraulic control apparatus 52 is in a normal condition:

Both Sol1 and Sol2 are energized. FS valve is "X", the brake B1 is released, and the brake B2 is applied.

② In case of disconnection of Sol1:

FS valve turns to "X" from "○", and the brake B1 turns from released state to applied state. In other words, the running mode turns from the Lo mode to the Hi mode, and the limp home running mode becomes equal to the driving mode of the Hi mode.

③ In case of disconnection of Sol2:

The brake B2 turns from applied state to released state, and the driving mode turns from the Lo mode to the neutral mode. In this connection, the Hi mode is selected as the limp home running mode. Specifically, the brake B1 is applied by switching Sol1 from "○" to "X".

④ In case of disconnection of all Sols:

The brake B1 turns from the released state to the applied state, and the brake B2 turns from the applied state to the released state. Therefore, the running mode turns from the Lo mode to the Hi mode, and the Hi mode is selected as the limp home running mode.

[In Case the Hi Mode is Selected]

① In case the hydraulic control apparatus 52 is in a normal condition:

The brake B1 is applied, and the brake B2 is released.

② In case of disconnection of at least one of the Sols:

Status of individual system is same as aforementioned case ①.

The running mode does not change from the Hi mode, and the limp home running mode also turns to the Hi mode.

Next, the contents of FIG. 5 will be described. First of all, in case of the running mode is Lo mode and the system is in the normal condition, the status of individual systems is same as the description above. If the disconnection of Sol1 occurs, Sol1 turns from "○" to "X" and the brake B1 is applied. In other words, a status becomes so-called "tie-up" status wherein both brakes B1 and B2 are applied. In this connection, the running mode is switched to the Hi mode by releasing the brake B2 with switching Sol2 from "○" to "X".

Thus, according to the first embodiment of the hydraulic control apparatus 52 in FIG. 1, it is possible to execute the limp home running by setting a gear ratio of the transmission 19 to high, even in case the fail is occurred in the hydraulic control apparatus 52 when the Lo mode or the Hi mode is selected. Also, if the Hi mode is selected, the linear solenoid valves SL1 and SL2 are totally controlled in a non-energized condition, so that increase of consumption of the electric power fed to the linear solenoid valves can be suppressed. Moreover, in case the Lo mode is selected and a disconnection fail occurs on Sol1, it is possible to avoid "an abrupt drop in the vehicle speed caused by a stoppage of the output shaft 25 due to an engagement of both brakes B1 and B2". Additionally, since the gear ratio if the transmission 29 is set to high, a raise in speed of the motor generator 7 can be supressed.

Here will be described the corresponding relation between the construction shown in FIGS. 1 and 2, and the construction of the present invention. The engine 1 corresponds to the first prime mover of the invention; the motor generator 7 corresponds to the second prime mover of the invention; the motor generator 6 corresponds to the rotary device of the invention; the linear solenoid valves SL1 and SL2 correspond to the gear ratio controlling mechanism of the invention; the fail-safe valve 88 corresponds to the control device of the invention; the brake B1 corresponds to the first frictional engagement device of the invention; the brake B2 corresponds to the second frictional engagement device of the invention; and the vehicle Ve corresponds to the hybrid vehicle of the invention.

Also, "the case in which at least one of the linear solenoid valves SL1 and SL2 is disconnected" corresponds to "the case in which a function of a gear ratio control mechanism declines" of the invention; "selecting the Hi mode as the running mode" corresponds to "controlling a status of the transmission so as to enable to suppress decline of a driving performance of a vehicle" of the invention; the low gear ratio corresponds to "a maximum gear ratio" and "a first gear ratio" of the invention; and a high gear ratio corresponds to "the gear ratio smaller than the maximum gear ratio" and "the second gear ratio" of the invention. Besides, the disconnection fail of the linear solenoid valve is exemplified in the first embodiment, however, "the case of a function of a gear ratio control mechanism declines" of the invention includes the case in which a short fail, in which the electric power is constantly fed to the linear solenoid valve, occurs.

Here will be described a second embodiment of the hydraulic control apparatus 52 with reference to FIG. 6. In the construction shown in FIG. 6, same referential numerals are allotted to the common construction with FIG. 1. A difference between the second embodiment and the first embodiment will be described hereafter. In the second embodiment, it is possible to feed the oil of the oil passages 74, 80, and 86 to the hydraulic chamber 63 of the primary regulator valve 56. There are provided selector valves 101 and 102 in order to feed the oil of the oil passages 74, 80, and 86 to the hydraulic chamber 63. This selector valve 101 comprises, a spool 104 which is applied an energizing force in a predetermined direction by an elastic member 103, and ports 105 to 110. Additionally, the oil passage 74 and the port 106 are communicated each other, the oil passage 80 is communicated with the ports 105 and 107, and the oil passage 86 and the port 110 are communicated eachother.

On the other hand, the selector valve 102 comprises, a spool 112 which is applied an energizing force in a predetermined direction by an elastic member 111, and ports 113 to 116. The oil passage 86 and the port 113 are communicated each other, and the port 116 and the hydraulic chamber 63 are communicated through an oil passage 117. Moreover, the port 114 and the port 108 are communicated through an passage 118, and the port 115 and the port 109 are communicated through an oil passage 119.

Besides, a fail-safe valve 120 is also provided in the second embodiment. Although a function of the fail-safe valve 120 is identical to that of the fail-safe valve 88 described in the first embodiment, a construction of the fail-safe valve 120 will be described hereafter, because the constructions of the fail-safe valve 120 and the fail-safe valve 88 are different. The fail-safe valve 120 comprises, a spool 122 which is applied an energizing force in a predetermined direction by an elastic member 121, and ports 123 to 128. The port 123 and the oil passage 80 are communicated each other; the ports 124 and 125 are communicated with the oil passage 86; the port 126 and the oil pan 55 are communicated each other; the port 127 and the oil passage 96 are communicated; and the port 128 and the oil passage 95 are communicated each other. In FIG. 6, the cooler 99 and a lubricating line (not shown) are communicated through an oil passage 129 with the port 62 of the primary regulator valve 56.

Next, an action of the hydraulic control apparatus 52 in the second embodiment, i.e., a control method of the invention will be described hereinafter. The actions and the functions of the linear solenoid valves S11 and SL2 are identical to those described in the first embodiment, even in the second embodiment. Specifically, in case the oil pressure of the oil passage 80 is regulated to raise the oil pressure of the hydraulic chamber 81 by an energization control of the linear solenoid valve SL1, the applying pressure of the brake B1 is increased. On the contrary, in case the oil pressure of the hydraulic chamber 81 drops, the applying pressure of the brake B1 is decreased.

Moreover, an action to control the oil pressure of the hydraulic chamber 87 by regulating the oil pressure of the oil passage 86 by the energization control of the linear solenoid valve SL1. First of all, in case of applying the brake B1, the oil pressure of the oil passage 80 rises, and the oil pressure of the oil passage 123 rises. Therefore, the spool 122 of the fail-safe valve 120 is applied the energizing force upward in FIG. 6 to narrow the opening area between the ports 125 and 128, and to communicate the port (i.e., the drain port) 126 and the port (i.e., the output port) 128. As a result, the oil pressure of the hydraulic chamber 87 is dropped by discharging the oil through the oil passage 95, and the applying force of the brake B2 is dropped.

On the other hand, in case of raising the applying force of the brake B2 with dropping the applying force of the brake B1, the energizing current of the linear solenoid valve SL1 is dropped and the energizing current of the linear solenoid valve SL2 is raised. Consequently, the oil pressure of the oil passages 80 and 123 drop, and the oil pressure of the oil passage 86 rises. When the oil pressure of the oil passage 80 drops, the spool 122 of the fail-safe valve 120 is applied the energizing force downward in FIG. 6 by the elastic member 121 to communicate the port (i.e., the input port) 125 and the port 128. As a result, the oil of the oil passage 86 is fed to the hydraulic chamber 87 through the oil passage 95 so that the applying pressure of the brake B2 is raised.

According to the second embodiment, moreover, in case the low speed mode, or the high speed mode, or the neutral mode is selected, and the fails described with reference to FIG. 4 occur, effects similar to those of the first embodiment can be achieved for the same reasons as those of the first embodiment. Here, in the second embodiment, the fail-safe valve 122 of FIG. 6 corresponds to the FS valve of FIG. 4.

Next, an action to regulate the oil pressure (i.e., a line pressure) PL of the oil passage 74 by the primary regulator valve 56 will be described hereafter. First of all, in case the low speed mode is selected, the oil pressure of the oil passage 80 drops and the oil pressure of the port 107 of the selector valve 101 also drops. Consequently, the spool 104 is applied with the energizing force upward in FIG. 6 by the elastic member 103 to interrupt the port (i.e., the first input port) 106 and the port (i.e., the output port) 109, and to communicate the port 109 and the port (i.e., the second input port) 110. Therefore, the oil of the oil passage 74 will not be fed to the oil passage 119. Also, in case the low speed mode is selected, the oil pressure of the oil passage 86 is raised so that the oil of the oil passage 86 is fed through the oil passage 119 to the port 115 of the selector valve 102. Specifically, the oil pressure regulated by the linear solenoid valve SL2 is fed to the port 115 of the selector valve 112, instead of the line pressure.

Figure 6:
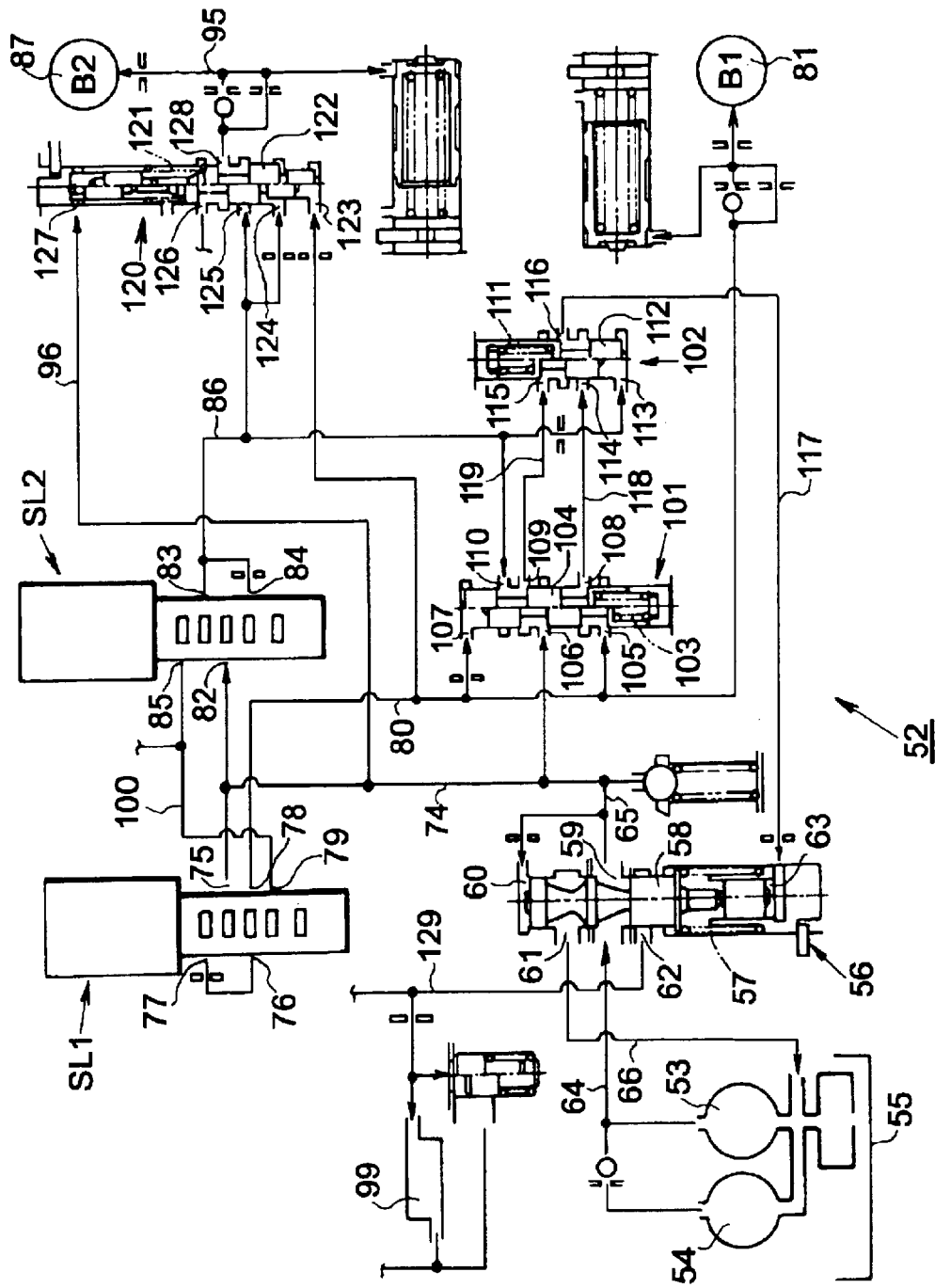
FIG. 6 is a hydraulic circuit diagram showing a second example of the control device of this invention.

Besides, the oil of the oil passage 86 is also fed to the port (i.e., the control port) 113 of the selector valve 112, and the spool 112 is applied with the energizing force upward in FIG. 6 by the rise of the oil pressure of the port 113. Therefore, the port 114 and the port 116 are cut off, and the port 116 and the port 115 are communicated each other. As a result, the oil of the oil passage 119 is fed through the oil passage 117 to the hydraulic chamber 63 of the primary regulator valve 56. Thus, in case the low speed mode is selected, the output oil pressure of the linear solenoid valve SL2 is transmitted to the hydraulic chamber 63, and the primary regulator valve 56 regulates the oil pressure from the oil passage 74 on the basis of the output oil pressure of the linear solenoid valve SL2 as the signal pressure.

On the other hand, in case the high speed mode is selected, the oil pressure of the oil passage 80 rises, and the oil pressure of the port 107 of the selector valve 101 also rises. Consequently, the spool 104 is applied the energizing force downward in FIG. 6 to cut off the port 109 from the port 110, to communicate the port 105 with the port 108, and to communicate the port 106 with the port 109. Therefore, the oil of the oil passage 86 will not be fed to the oil passage 119, and the oil of the oil passage 80 is fed through the oil passage 118 to the port 114 of the selector valve 102. Also, the oil of the oil passage 74 is fed through the oil passage 119 to the port 115 of the selector valve 102.

Moreover, because of the drop of the oil pressure of the oil passage 86 and the port 113, the spool 112 of the selector valve 102 is applied with the energizing force downward in FIG. 6. Therefore, the port 115 and the port 116 are cut off, and the port 114 and the port 116 are communicated each other. As a result, the oil of the oil passage 118 is fed through the oil passage 117 to the hydraulic chamber 63 of the primary regulator valve 56. Thus, in case the high speed mode is selected, the output oil pressure of the linear solenoid valve SL1 is transmitted to the hydraulic chamber 63, and the primary regulator valve 56 regulates the oil pressure from the oil passage 74 on the basis of the output oil pressure of the linear solenoid valve SL1 as the signal pressure.

Furthermore, an action of the changing time between the low speed mode and the high speed mode, in other words, an action of the case to change the gear ratio in the transmission 19 will be described hereafter. In case of changing the gear ratio of the transmission 19, both of the linear solenoid valves SL1 and SL2 are transiently controlled in the energized state. Specifically, the oil pressure of the port 107 of the selector valve 101 becomes higher than the predetermined oil pressure, and the oil pressure of the port 113 of the selector valve 102 becomes higher than the predetermined oil pressure. Consequently, in the selector valve 101, the port 106 and the port 109 are communicated each other, the port 109 and the port 110 are cut off, and the port 105 and the port 108 are communicated each other. Also, in the selector valve 102, the port 115 and the port 116 are communicated each other, and the port 114 and the port 116 are cut off. Therefore, the oil of the oil passage 74 is fed through the oil passages 119 and 117 to the hydraulic chamber 63 of the primary regulator valve 56. Besides, the oil of the oil passages 80 and 86 is not fed to the oil passage 117. Thus, the primary regulator valve 56 regulates the oil pressure of the oil passage 74 on the basis of the oil pressure of the oil passage 74 itself as the signal pressure Next, an action of the case to change from the low speed mode to the high speed mode in the second embodiment will be described with reference to the time chart of FIG. 7. First of all, the low speed mode is selected before the time t1. In the low speed mode, an output oil pressure Psol1 of the linear solenoid valve SL1 is controlled to a low pressure (e.g., zero), and an output oil pressure Psol2 of the linear solenoid valve SL2 is controlled to a high pressure (e.g., an oil pressure P3). Also, the oil pressure of the oil passage 74 is an oil pressure (i.e., a line pressure) PL. Here, the oil pressure P3 is lower than the oil pressure PL. It is because the oil pressure P3 is generated by reducing the oil pressure PL by the linear solenoid valve SL2. Besides, in the low speed mode, the oil pressure PL is generated on the basis of the output pressure of the linear solenoid valve SL2 as the signal pressure.

When a speed change command, in other words, a command to change from the low speed mode to the high speed mode is generated at the time t1, a preparation control prior to execute the speed change is executed. Specifically, the output oil pressure Psol1 of the linear solenoid valve SL1 is raised higher than the oil pressure P1 but lower than the oil pressure P2. Consequently, the oil pressure PL is generated on the basis of the oil pressure from the oil passage 74 as the signal pressure. In other words, the oil pressure PL, which is higher than the output oil pressure Psol2 of the linear solenoid valve SL2, is transmitted to the hydraulic chamber 63 of the primary regulator valve 56. As a result, a regulation level of the primary regulator valve 56 rises and the oil pressure PL exceeds that before the time t1. Specifically, the oil pressure (i.e., the line pressure) PL outputted from the port 59 is controlled to a generally constant pressure set in accordance with the regulation level governed by the oil pressure of the hydraulic chamber 63 and the elastic force of the elastic member 57.

Then, the output oil pressure Psol2 of the linear solenoid valve SL2 is lowered and the output oil pressure Psol1 of the linear solenoid valve SL1 is raised. Therefore, there is a time period in which both of the output oil pressure Psol1 of the linear solenoid valve SL1 and the output oil pressure Psol2 of the linear solenoid valve SL2 rises higher than the oil pressure P2. After that, the output oil pressure Psol2 of the linear solenoid valve SL2 drops lower than the oil pressure P2. At the time t3, the output oil pressure Psol1 of the linear solenoid valve SL1 is controlled to the oil pressure P3, also, the output oil pressure Psol2 of the linear solenoid valve SL2 is controlled to zero, then the speed change control is ended. Here, in the description above, the oil pressure P2 is lower than the oil pressure P3, the oil pressure P1 is lower than the oil pressure P2.

Thus, in the second embodiment, the oil pressure PL can be regulated by the function of selector valves 101 and 102 without using the linear solenoid valve SLT mentioned in the first embodiment. In each of case, such as, when the high speed mode is selected, when the low speed in selected, or during the speed change control, a minimum necessary line pressure which is appropriate for each of aforementioned cases can be generated by the primary regulator valve 56 by changing the oil pressure to be employed as the signal pressure thereto (to the primary regulator valve 56). Therefore, power loss caused by driving of the oil pumps 53 and 54. Moreover, the oil pressure PL can be controlled to generally constant pressure at the changing time from the low speed mode to the high speed mode. In other words, a variation in the oil pressure PL can be suppressed, and a fluctuation in the torque to be transmitted to the output shaft 25 can be supressed. Therefore, a speed change characteristics of the transmission 19 is improved.

Figure 7:
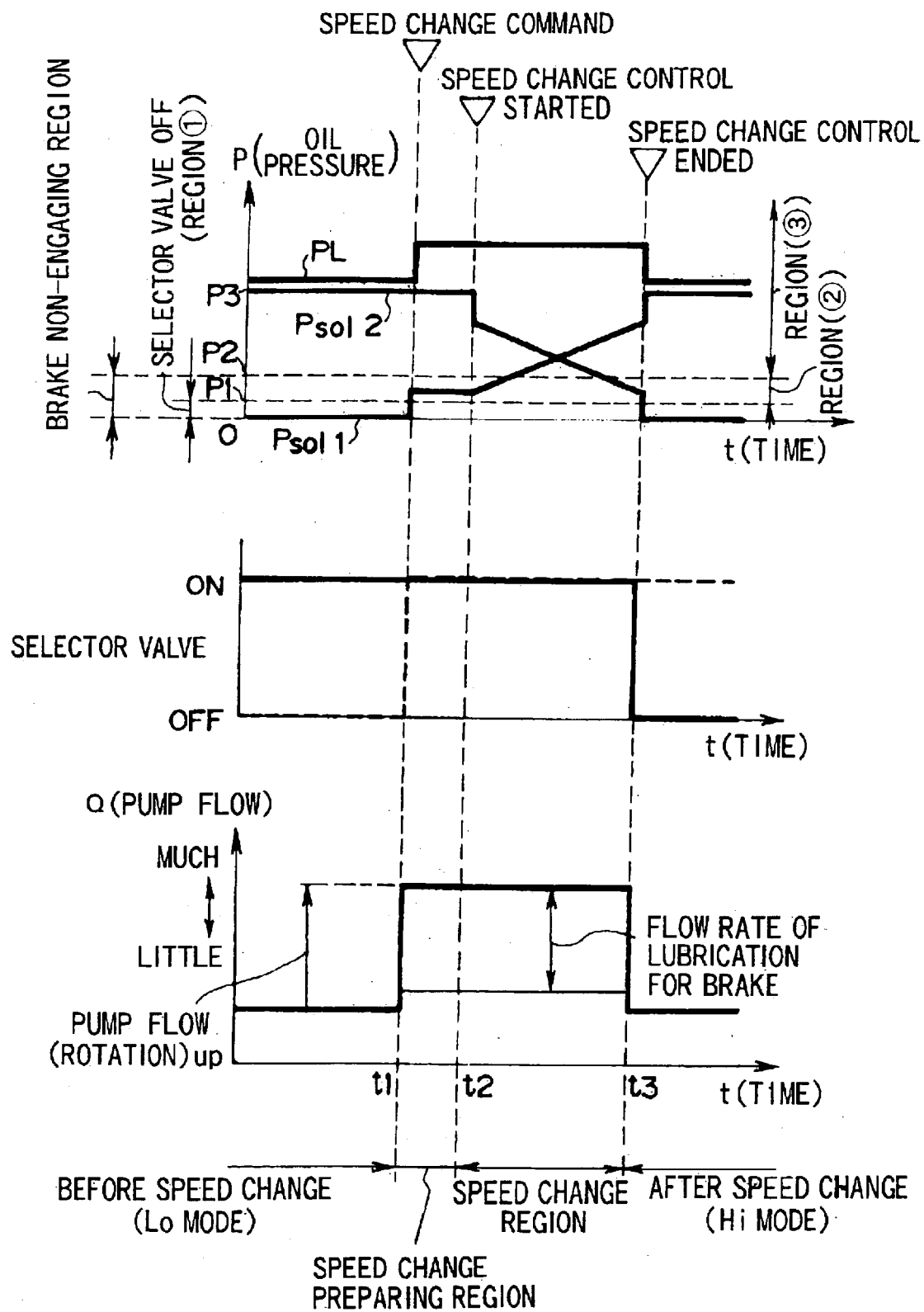
FIG. 7 is a time chart for explaining an action of the hydraulic circuit shown in FIG. 6.

Here will be described an action of the selector valves 101 and 102 in aforementioned speed change control. As shown in FIG. 7, before the time t1, the selector valve 101 is in an OFF state as indicated by a broken line, and the selector valve 102 is in an ON state as indicated by a solid line. Here, the OFF state of the selector valve 101 means the state, wherein the spool 104 stops at the position of right side of the axis shown in FIG. 6, wherein the oil passage 109 and the oil passage 110 are communicated each other, wherein the oil passage 80 and the oil passage 118 are cut off, and wherein the oil passage 74 and the oil passage 119 are cut off. Also, the ON state of the selector valve 102 means the state, wherein the spool 112 stops at the position of left side of the axis shown in FIG. 6, wherein the oil passage 119 and the oil passage 117 are communicated, and wherein the oil passage 118 and the oil passage 117 are cut off each other.

Additionally, the selector valves 101 and 102 are both in the ON state from the time t1 to the time t3. Here, the ON state of the selector valve 101 means the state, wherein the spool 104 stops at the left side position of the axis shown in FIG. 6, wherein the oil passage 74 and the oil passage 119 are communicated each other, wherein the oil passage 80 and the oil passage 118 are communicated each other, and wherein the oil passage 86 and the oil passage 119 are cut off.

Moreover, after the time t3 the selector valve 101 is in the ON state, and the selector valve 102 is in the OFF state. Here, the OFF state of the selector valve 102 means the state, wherein the spool 112 stops at the right side position of the axis shown in FIG. 6, wherein the oil passage 118 and the oil passage 117 are communicated each other, and wherein the oil passage 119 and the oil passage 117 are cut off.

Next, the corresponding relation between the output oil pressure of the linear solenoid valves SL1 and SL2 and the speed change mode will be described hereafter with reference to the time chart of FIG. 7 and the table of FIG. 8. In the second embodiment, two kinds of the neutral mode are selectable, as shown in FIG. 8.

First, in case the neutral mode ① is selected, the output oil pressure Psol1 of the linear solenoid valve SL1 is controlled within a region ① which is lower than the oil pressure P1, and the output oil pressure Psol2 of the linear solenoid valve SL2 is controlled within a region ② which is higher than the oil pressure P1 but lower than the oil pressure P2. On the other hand, in case the neutral mode (b 2) is selected, the output oil pressure Psol1 of the linear solenoid valve SL1 is controlled within the region ② which is lower than the oil pressure P2 but higher than the oil pressure P1, and the output oil pressure Psol2 of the linear solenoid valve SL2 is controlled within the region ① which is lower than the oil pressure P1. Here, the neutral mode (1) and the neutral mode (2) are selected appropriately depending on the case if the low speed mode is selected or if the high speed mode is selected, subsequently to the neutral mode.

On the other hand, in case the low speed mode is selected, the output oil pressure Psol1 of the linear solenoid valve SL1 is controlled within the region ① which is lower than the oil pressure P1, and the output oil pressure Psol2 of the linear solenoid valve SL2 is controlled within a region ③ which is higher than the oil pressure P2. Moreover, in case the high speed mode is selected, the output oil pressure Psol1 of the linear solenoid valve SL1 is controlled within the region ③, and the output oil pressure Psol2 of the linear solenoid valve SL2 is controlled within the region ①. In case the low speed mode is expected to be selected subsequently to the neutral mode, the neutral mode (1) is selected, and in case the high speed mode is expected to be selected subsequently to the neutral mode, the neutral mode (2) is selected. Here, a neutral mode (3) is not selected in the second embodiment. This neutral mode (3) will be described later.

Moreover, during the preparation control prior to execute the speed change from the low speed mode to the high speed mode, the output oil pressure Psol1 of the linear solenoid valve SL1 is controlled within the region ②, and the output oil pressure Psol2 of the linear solenoid valve SL2 is controlled within the region ③, as has been described above. On the other hand, during the preparation control prior to execute the speed change from the high speed mode to the low speed mode, the output oil pressure Psol1 of the linear solenoid valve SL1 is controlled within the region ③, and the output oil pressure Psol2 of the linear solenoid valve SL2 is controlled within the region ②.

Furthermore, during the speed change from the time t2 to the time t3 , the output oil pressure Psol1 of the linear solenoid valve SL1 is controlled within the region ③, and the output oil pressure Psol2 of the linear solenoid valve SL2 is controlled within the region ③. Here, in case the output oil pressure of the linear solenoid valve is lower than P2, individual brake comes into a non-engagement state (i.e., a torque capacity is zero), and in case of the output oil pressure of the linear solenoid valve is lower than P1, the selector valve corresponding to the linear solenoid valve becomes the OFF state.

Here will be described the corresponding relation between the items described in the second embodiment and the construction of the invention. The oil pressure transmitted to the hydraulic chamber 63, i.e., the oil pressure of the linear solenoid valves SL1 and SL2, and the oil pressure of the oil passage 74 correspond to the signal pressure of the invention; the oil pressure PL of the oil passage 74 corresponds to the predetermined control oil pressure of the invention; and the primary regulator valve 56 corresponds to the control oil pressure generation valve of the invention. Here, the corresponding relation between rest of the items described in the second embodiment and the construction of the present invention are identical to that between first embodiment and the construction of the present invention.

Figure 9:
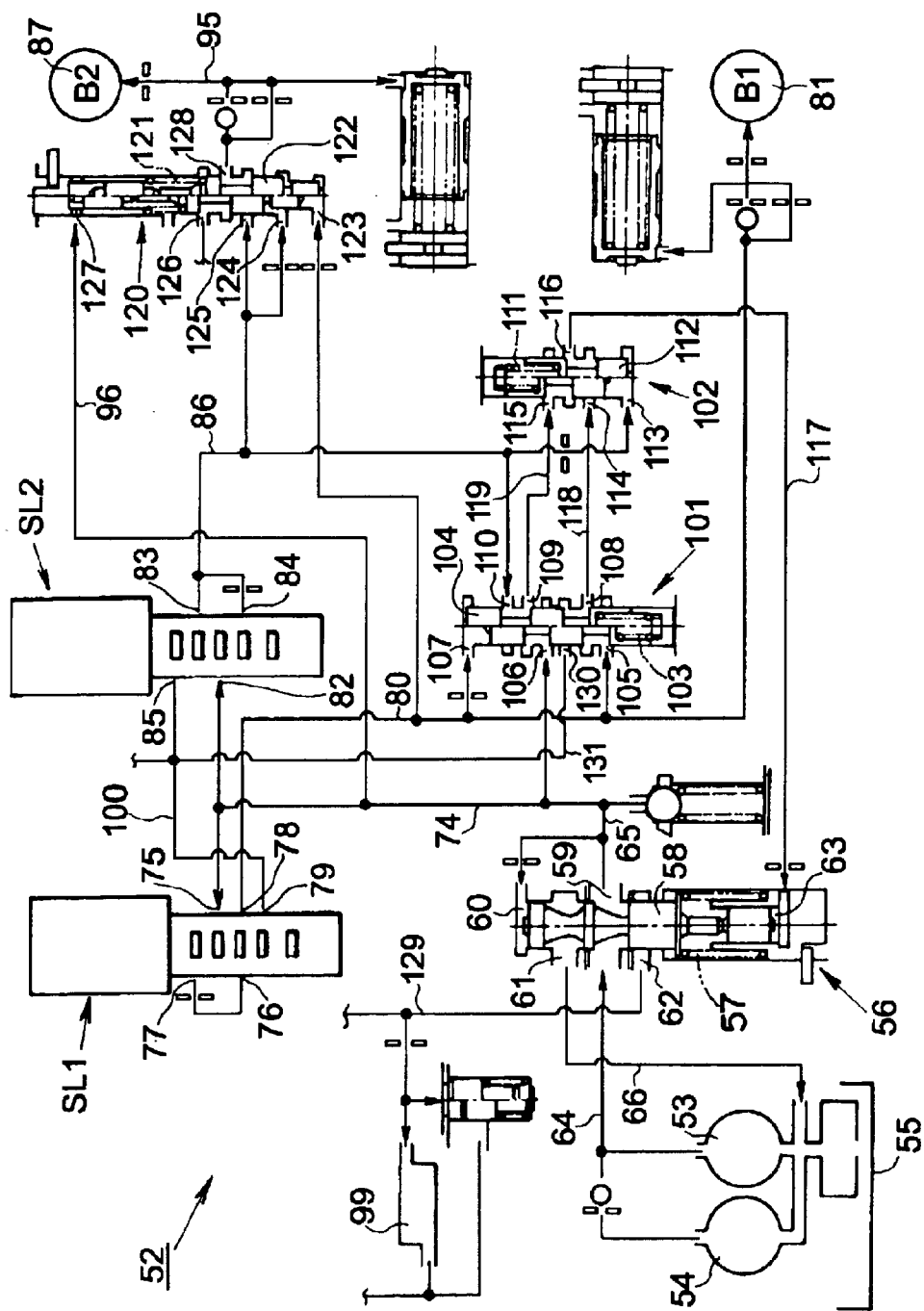
FIG. 9 is a hydraulic circuit diagram showing a third embodiment of the control device of this invention.

Next, here will be described a third embodiment of the hydraulic control apparatus 52 with reference to FIG. 9. In the construction shown in FIG. 9, same referential numerals as that of FIG. 1 and FIG. 6 are allotted to the construction identical to that of FIG. 1 and FIG. 6. In the third embodiment, there is formed a port 130 in the selector valve 101, and the port 130 and the port 100 are communicated through the oil passage 131. In case the selector valve 101 is turned to the OFF state, the port 108 and the port 130 are communicated. On the contrary, in case of the selector valve 101 is turned to ON state, the port 130 is closed.

In the third embodiment, the neutral mode (3) of FIG. 8 is selectable as the mode to control the transmission 19. The neutral mode (1) and the neutral mode (2) are not selected in the third embodiment. In case the neutral mode (3) is selected, the output oil pressure Psol1 of the linear solenoid valve SL1 is controlled within the region ① shown in FIG. 7, and the output oil pressure Psol2 of the linear solenoid valve SL2 is also controlled within the region ①. Namely, in the third embodiment, both of the selector valves 101 and 102 are turned to OFF state in case the neutral mode is selected. In this connection, the oil passages 117, 118, and 131 are communicated altogether, and the oil of the hydraulic chamber 63 is discharged to the oil pan 55 through the oil passages 117, 118, and 131.

Thus, the oil pressure of the hydraulic chamber 63 is controlled lower than the predetermined oil pressure, specifically, controlled to zero. Namely, the minimum pressure of the oil pressure PL of the oil passage 74 regulated by the primary regulator valve 56 is set to a constant pressure governed by a part of the primary regulator valve 56, specifically, a pressure governed by the energizing force of the elastic member 57. Accordingly, in case the neutral mode (3) is set, the variation in the minimum pressure of the oil pressure PL of the oil passage 74 is small, and an accuracy of estimating a load of the oil pumps 53 and 54 is improved. Additionally, in case the load of the oil pump 53 is small, fuel consumption of the engine 1 can be improved by controlling the engine output to low level.

In the third embodiment, the time chart of FIG. 7 and its description thereof is applied as it is. Also, in the third embodiment, speed change modes sown in FIG. 8 is selectable as the speed change made, other than the neutral mode (3). Here will be described the corresponding relation of the construction between the third embodiment and the invention. "The case in which the neutral mode is selected" corresponds to "the case in which transmission of the torque is impossible" of the invention; and "controlling the oil pressure of the hydraulic chamber 63 to zero" corresponds to "controlling the signal pressure lower than the predetermined oil pressure" of the invention. Here, the corresponding relation between other constructions in the third embodiment and the construction of the present invention are similar to the corresponding relation between the constructions of the first and second embodiment and the construction of the present invention.

Next, here will be described a fourth embodiment of the hydraulic control apparatus 52 with reference to FIG. 10. In the fourth embodiment, a construction of a selector valve 132 to which the output oil pressure of the linear solenoid valve SL2 is transmitted is different from that of the third embodiment. The selector valve 132 comprises, a spool 134 which is applied with an energizing force in a predetermined direction by an elastic member 133, and ports 135 to 140. The port 108 of the selector valve 101 and the port 136 of the selector valve 132 are communicated through the oil passage 118, and the port 109 and the port 137 are communicated through the oil passage 119.

Also, the oil passage 86 is communicated with the ports 135 and 138. Moreover, the hydraulic chamber 63 and the port 139 are communicated through the oil passage 141. Furthermore, the port 140 is communicated with the ports 124 and 125 of the fail-safe valve 120 through the oil passage 142. Still moreover, the oil passage 118 and the hydraulic chamber 81 are communicated through the oil passage 143. In the selector valve 132 of the aforementioned construction, the movement of the spool 134 is governed on the basis of the relation between the energizing force of the elastic member 133 and the energizing force corresponding to the oil pressure of the port 135. Here, in the construction shown in FIG. 10, same referential numerals as that of FIGS. 1 and 6 are allotted to the construction identical to that of FIGS. 1 and 6.

The relation between the output oil pressure Psol1 of the linear solenoid valve SL1 and the ON/OFF of the selector valve 101 is similar to that of the third embodiment, also in the fourth embodiment. On the other hand, in case the output oil pressure Psol2 of the linear solenoid valve SL2 rises, the spool 134 moves upward in FIG. 10 and the selector valve 132 turns to the ON state. When the selector valve 132 turns to ON state, the port 136 and the port 139 are cut off, the port 137 and the port 139 are communicated each other, and the port 138 and the port 140 are communicated.

Figure 10:
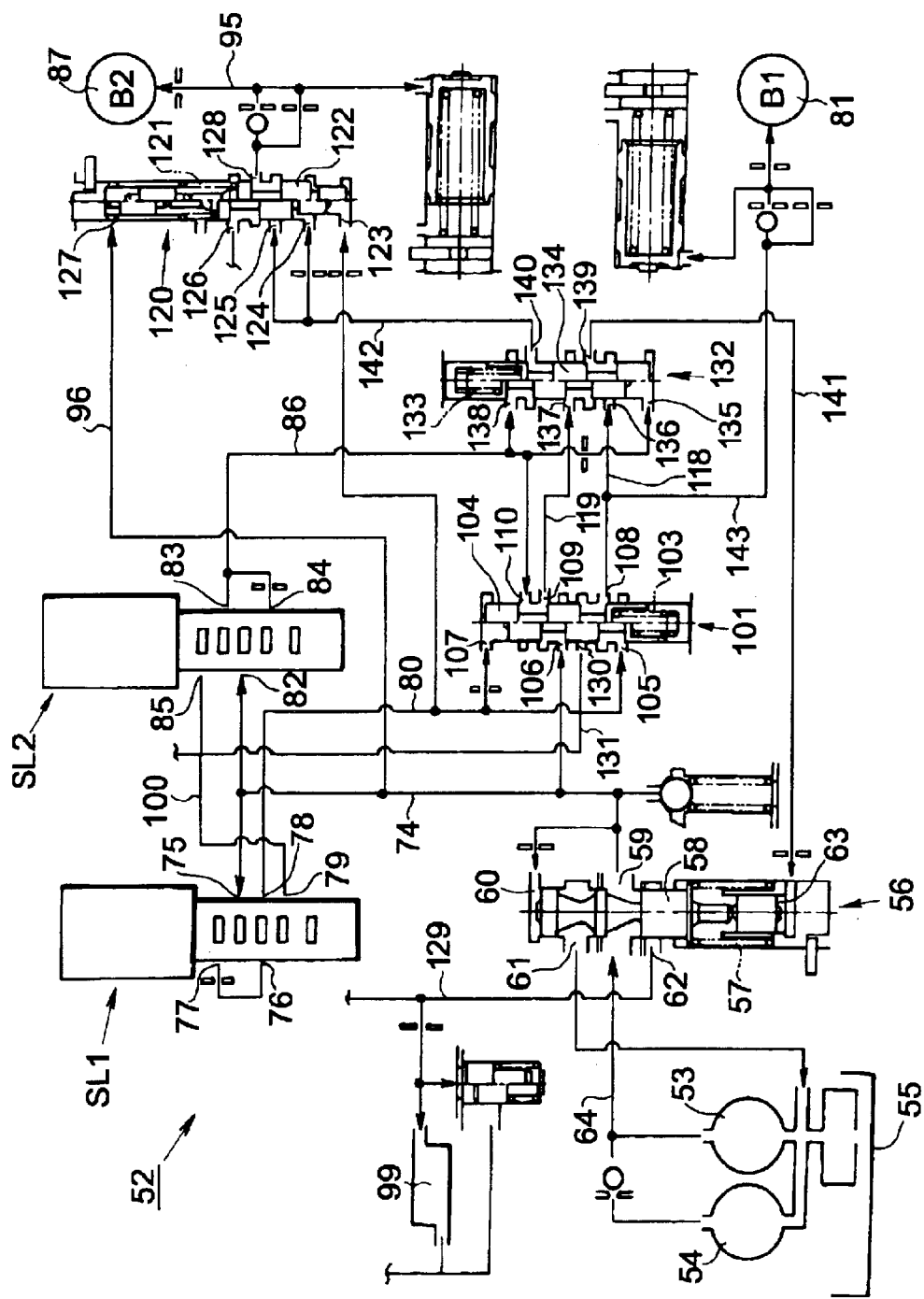
FIG. 10 is a hydraulic circuit diagram showing a fourth embodiment of the control device of this invention.

On the other hand, in case the output oil pressure Psol2 of the linear solenoid valve SL2 lowers, the spool 134 moves downward in FIG. 10 and the selector valve 132 turns to the OFF state. When the selector valve 132 turns to OFF state, the port 136 and the port 139 are communicated, the port 137 and the port 139 are cut off, and the port 138 and the port 140 are cut off.

In case the Lo mode is selected in the fourth embodiment, the selector valve 101 is controlled to the OFF state, and the selector valve 102 is controlled to the ON state. In this connection, the oil of the oil passage 86 is fed to the ports 124 and 125 of the fail-safe valve 120 through the oil passage 142. Here, in case Lo mode is selected, because the oil pressures of the oil passage 80 and the port 123 are low, the spool 122 moves downward in FIG. 10, in short, the fail-safe valve 120 is in the ON state. Therefore, the oil of the oil passage 142 is fed to the hydraulic chamber 87 through the oil passage 95, and the oil pressure of the hydraulic chamber 87 is thereby raised. Consequently, the brake B2 is applied. Moreover, the oil of the oil passage 119 is fed to the hydraulic chamber 63 through the oil passage 141, and the oil pressure PL of the oil passage 74 is controlled by the output oil pressure Psol2 of the linear solenoid valve SL2.

Also, the selector valve 101 is turned to the OFF state in case the Lo mode is selected, so that the oil of the oil passage 80 is not fed to the hydraulic chamber 81, and the oil of the hydraulic chamber 81 is discharged through the oil passages 143 and 131. Therefore, the brake B is released.

On the other hand, in case the Hi mode is selected, the selector valve 101 is controlled to the ON state and the ports 105 and 108 are communicated each other, so that the oil of the oil passage 80 is fed to the hydraulic chamber 81 through the oil passage 143, and thereby the oil pressure of the hydraulic chamber 81 is thereby raised. Consequently, the applying pressure of the brake B1 is increased. Also, the selector valve 132 is controlled to the OFF state in case the Hi mode is selected. Therefore, the oil of the oil passage 118 is fed to the hydraulic chamber 63 through the oil passages 141. In other words, the oil pressure PL of the oil passage 74 is controlled by the output oil pressure Psol1 of the linear solenoid valve SL1. Here, the selector valve 101 is turned to the ON state in case the Hi mode is selected, so that the oil of the oil passage 86 is not fed to the oil passage 119.

Also, the selector valve 132 is controlled to the OFF state in case the Hi mode is selected, so that the oil of the oil passage 74 is not fed to the oil passage 141. Moreover, the oil of the oil passage 86 is not fed to the oil passage 142. Since the oil pressure of the oil passage 80 is high, the oil pressure of the port 123 is raised to move the spool 122 upward in FIG. 10, and the ports 128 and 126 are thereby communicated each other. Therefore, the oil of the hydraulic chamber 87 is drained from the oil passage 95 to lower the oil pressure of the hydraulic chamber 87, and the brake B2 is thereby released.

Moreover, in case the neutral mode is selected, the selector valves 101 and 132 are both controlled to the OFF state. In case the selector valve 101 is controlled to the OFF state, the oil of the oil passage 80 is not fed to the hydraulic chamber 81, and the oil of the hydraulic chamber 81 is discharged through the oil passages 143 and 131. Therefore, the brake B1 is released. Besides, the oil of the oil passage 74 is not fed to the oil passage 141 in case the selector valve 101 is in the OFF state. In case the selector valve 132 is controlled to the OFF state, the oil of the oil passage 86 is not fed to the hydraulic chamber 87, and the oil of the hydraulic chamber 87 is discharged from the oil passage 95. Therefore, the oil pressure of the hydraulic chamber 87 is lowered, and brake B2 is thereby released also.

In the fourth embodiment, the time chart of the case to change from the Lo mode to the Hi mode is similar to FIG. 7. Individual speed change modes other than the neutral modes (1) and (2) of FIG. 8 are selectable, also in the fourth embodiment. Also, changing from the Lo mode to the Hi mode, and the preparation control at the changing time from the Hi mode to the Lo mode are similar to those of FIG. 8. Moreover, the control during the changing from Lo mode to Hi mode, or the control during the from Hi mode to Lo mode are identical to that of FIG. 8. In the transient state of the speed change control, both of the selector valves 101 and 102 are turned to ON state. Therefore, the oil of the oil passage 74 is transmitted to the hydraulic chamber 63 through the oil passages 119 and 141. In other words, a regulation of the primary regulator valve 56 is executed on the basis of the oil pressure from the oil passage 74 as the signal pressure.

On the other hand, moreover, in case a fail in which the selector valves 101 and 132 are both fixed to the OFF state, in short, a stick fail occurs, the oil pressure PL becomes the low pressure because the oil pressure PL is regulated on the basis of the oil pressure from the oil passage 74 as the signal pressure. On the contrary, in the fourth embodiment, the output oil pressure Psol1 of the linear solenoid valve SL1 is transmitted through the selector valve 101 to the hydraulic chamber 81, and the output oil pressure Psol2 of the linear solenoid valve SL2 is transmitted through the selector valve 132 to the hydraulic chamber 87. The selector valves 101 and 132 are constructed not to transmit the oil pressure of the oil passage 80 to the hydraulic chamber 81 in case the selector valve 101 is in the OFF state, and not to transmit the oil pressure of the oil passage 86 to the hydraulic chamber 87 in case the selector valve 132 is in the OFF state.

In the fourth embodiment, therefore, "transmitting the output oil pressure Psol1 or the output oil pressure Psol2 generated by reducing the low oil pressure PL to the brake B1 or B2" can be certainly prevented, even when said stick fail occurs. In other words, the brakes B1 and B2 are both remain released. Accordingly, "slippage or seizing of the brake B1 or B2, due to the shortage of the torque capacity of brakes B1 and B2" can be prevented from occurring. Here, the action and the effect similar to those of the first embodiment to the third embodiment can be obtained by the constructions of the fourth embodiment similar to those of the first embodiment to the third embodiment. Besides, the corresponding relation between other constructions in the fourth embodiment and the construction of the present invention are similar to that between the constructions of the first to third embodiment and the construction of the present invention.

Here will be described a fifth embodiment of the hydraulic control apparatus 52 with reference to FIG. 11. The hydraulic control apparatus 52 shown in FIG. 11 comprises selector valves 144 and 155. The selector valve 144 comprises, an elastic member 146, a spool 147 which is applied with an energizing force in a predetermined direction by an elastic member 146, and ports 148 to 156. The ports 148 and 151 are communicated with the oil passage 80, and the port 152 is communicated with the oil pan 55 through 15 the oil passage 131. Also, the port 153 and the oil passage 129 are communicated each other, and the port 149 and the oil passage 74 are communicated each other. Moreover, the oil passage 86 and the port 154 are communicated each other. In the selector valve 144 thus constructed, the movement of the spool 147 is governed by the energizing force of the elastic member 146 and the energizing force corresponding to the oil pressure of the port 148.

On the other hand, the selector valve 145 comprises, a spool 159 which is applied with an energizing force in a predetermined direction by an elastic member 158, ports 160 to 167, and a port 171. The port 157 and the port 167 are communicated through the oil passage 168, and the oil passage 131 and the port 164 are communicated through the oil passage 169. The oil passage 86 is communicated with the ports 160 and 163, and the port 162 and the port 155 are communicated through the oil passage 119. Moreover, the port 161 and the port 156 are communicated through the oil passage 118, and the port 167 and the hydraulic chamber 63 through the oil passage 141. The ports 124 and 125 are communicated with the port 166 through the oil passage 142, and the port 171 is communicated with an oil passage 170. The oil passage 170 reaches the vicinity of the brakes B1 and B2. In the selector valve 145 thus constructed, the movement of the spool 159 is governed by the energizing force of the elastic member 158 and the energizing force corresponding to the oil pressure of the port 160. In the construction shown in FIG. 11, same referential numerals as those of FIGS. 1, 6, 9, and 10 are allotted to the construction similar to that of FIGS. 1, 6, 9, and 10.

Figure 11:
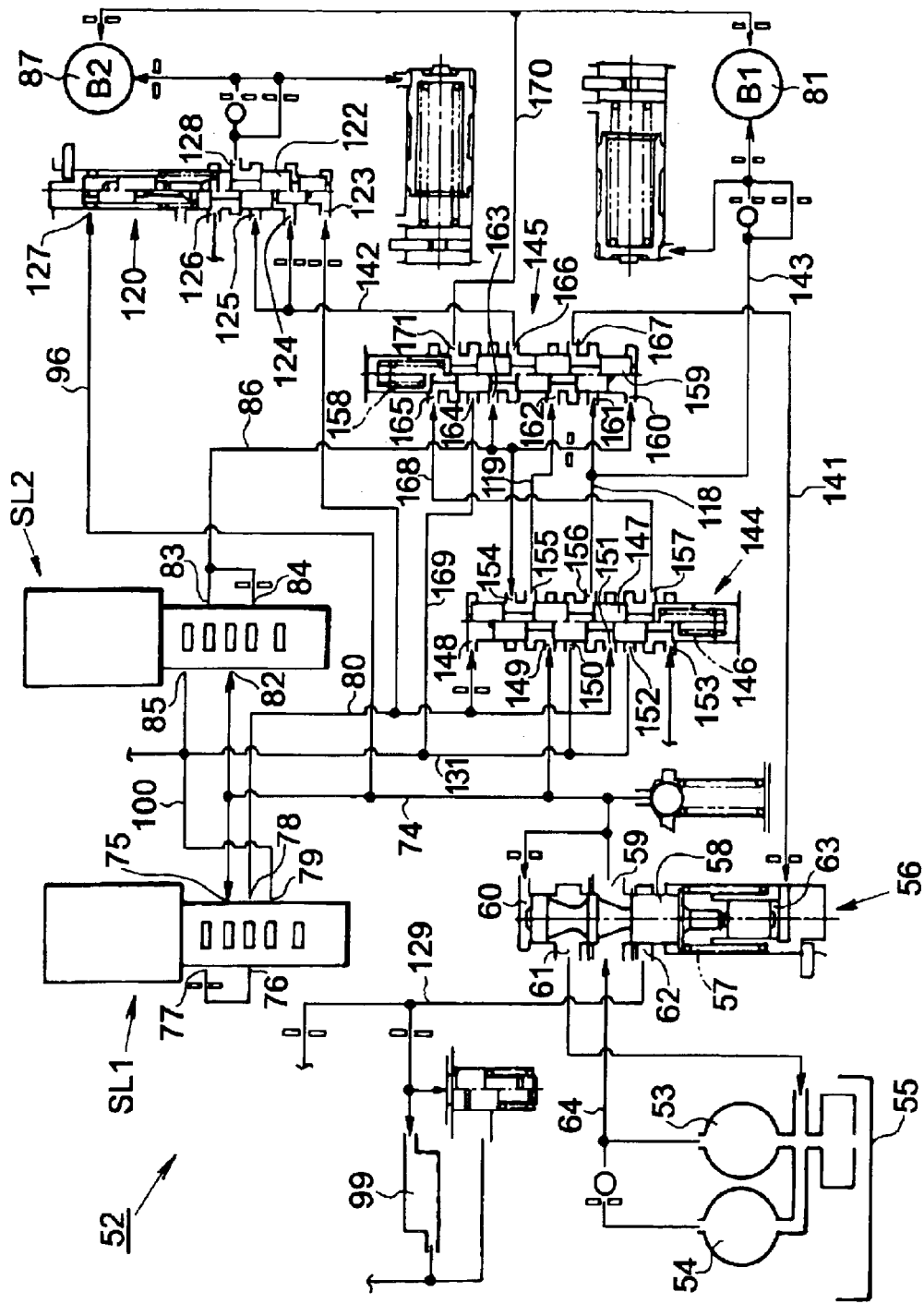
FIG. 11 is a hydraulic circuit diagram showing a fifth embodiment the control device of this invention.

In the fifth embodiment, in case the output oil pressure Psol1 of the linear solenoid valve SL1 rises, the oil pressure of the port 148 of the selector valve 144 is raised to move the spool 147 downward in FIG. 11, and the selector valve 144 turns to the ON state. When the selector valve 144 turns to the ON state, the port 153 and the port 157 are communicated each other, the port 151 and the port 156 are communicated each other, and the port 149 and the port 155 are communicated each other. At the same time, the port 152 and the port 157 are cut off, the port 150 and the port 156 are cut off, and the port 154 and the port 155 are cut off.

On the other hand, in case the output oil pressure Psol1 of the linear solenoid valve SL1 lowers, the oil pressure of the port 148 of the selector valve 144 is lowered to move the spool 147 upward in FIG. 11, and the selector valve 144 turns to the OFF state. When the selector valve 144 turns to the OFF state, the port 152 and the port 157 are communicated each other, the port 150 and the port 156 are communicated, and the port 154 and the port 155 are communicated each other. At the same time, the port 153 and the port 157 are cut off, the port 151 and the port 156 are cut off, and the port 149 and the port 155 are cut off.

On the contrary, in case the output oil pressure Psol2 of the linear solenoid valve SL2 rises, the oil pressure of the port 160 of the selector valve 145 is raised to move the spool 159 upward in FIG. 11, and the selector valve 145 turns to the ON state. When the selector valve 145 turns to the ON state, the port 162 and the port 167 are communicated each other, the port 163 and the port 166 are communicated each other, and the port 165 and the port 171 are communicated each other. At the same time, the port 161 and the port 167 are cut off, and the port 164 and the port 171 are cut off.

On the other hand, in case the output oil pressure Psol2 of the linear solenoid valve SL2 lowers, the oil pressure of the port 160 of the selector valve 145 is lowered to move the spool 159 downward in FIG. 11, and the selector valve 145 turns to the OFF state. When the selector valve 145 turns to the OFF state, the port 161 and the port 167 are communicated each other, and the port 164 and the port 171 are communicated each other. At the same time, the port 162 and the port 167 are cut off, the port 163 and the port 166 are cut off, and the port 165 and the port 171 are cut off.

In case the Hi mode is selected in the fifth embodiment, the selector valve 144 is controlled to the OFF state, and the selector valve 145 is controlled to the ON state. In this connection, the oil of the oil passage 86 is fed to the ports 124 and 125 of the fail-safe valve 120 through the oil passage 142. Here, in case the Lo mode is selected, since the oil pressure of the oil passage 80 and the port 123 are low, the spool 122 moves downward in FIG. 11, in short, the fail-safe valve 120 is in ON state. Therefore, the oil of the oil passage 142 is fed to the hydraulic chamber 87 through the oil passage 95, and the oil pressure of the hydraulic chamber 87 is thereby raised. Consequently, the brake B2 is applied. Moreover, the oil of the oil passage 86 is fed to the hydraulic chamber 63 through the oil passages 119 and 141, and the oil pressure PL of the oil passage 74 is controlled by the output oil pressure Psol2 of the linear solenoid valve SL2.

Also, the selector valve 144 is turned to the OFF state in case the Lo mode is selected, so that the oil of the oil passage 80 is not fed to the hydraulic chamber 81, and the oil of the hydraulic chamber 81 is discharged through the oil passages 143 and 131. Therefore, the brake B is released.

On the other hand, in case the Hi mode is selected, the selector valve 144 is controlled to the ON state and the ports 151 and 156 are communicated each other, so that the oil of the oil passage 80 is fed to the hydraulic chamber 81 through the oil passages 118 and 143, and the oil of the hydraulic chamber 81 is thereby raised. Consequently, the applying pressure of the brake B1 is increased. Also, the selector valve 145 is controlled to the OFF state in case the Hi mode is selected. Therefore, the oil of the oil passage 118 is fed to the hydraulic chamber 63 through the oil passages 141. In other words, the oil pressure PL of the oil passage 74 is controlled by the output oil pressure Psol1 of the linear solenoid valve SL1. Here, the selector valve 144 is turned to the ON state in case the Hi mode is selected, so that the oil of the oil passage 86 is not fed to the oil passage 119.

Also, the selector valve 144 is controlled to the ON state in case the Hi mode is selected, so that the oil of the oil passage 74 is not fed to the oil passage 119. Moreover, the oil of the oil passage 86 is not fed to the oil passage 142. Since the oil pressure of the oil passage 80 is high, the oil pressure of the port 123 is raised to move the spool 122 upward in FIG. 11, and the ports 128 and 126 are thereby communicated each other. Therefore, the oil of the hydraulic chamber 87 is drained from the oil passage 95 to lower the oil pressure of the hydraulic chamber 87, and the brake B2 is thereby released.

Moreover, in case the neutral mode is selected, the selector valves 144 and 155 are both controlled to the OFF state. In case the selector valve 144 is controlled to the OFF state, the oil of the oil passage 80 is not fed to the hydraulic chamber 81, and the oil of the hydraulic chamber 81 is discharged through the oil passages 143, 118 and 131. Therefore, the brake B1 is released. Besides, the oil of the oil passage 74 is not fed to the oil passage 141 in case the selector valve 144 is in the OFF state. In case the selector valve 145 is controlled to the OFF state, the oil of the oil passage 86 is not fed to the hydraulic chamber 87, and the oil of the hydraulic chamber 87 is discharged from the oil passage 95. Therefore, the oil pressure of the hydraulic chamber 87 is lowered, and brake B2 is thereby released also.

In the fifth embodiment, the time chart of the case to change from the Lo mode to the Hi mode is similar to FIG. 7. Individual speed change modes other than the neutral modes (1) and (2) of FIG. 8 are selectable, also in the fifth embodiment. Also, changing from the Lo mode to the Hi mode, and the preparation control at the changing time from the Hi mode to the Lo mode are similar to that of FIG. 8. Moreover, the control during the changing from the Lo mode to the Hi mode, or the control during the changing from the Hi mode to the Lo mode are similar to that of FIG. 8. In the transient state of the speed change control, both of the selector valves 144 and 145 are turned to the ON state. Therefore, the oil of the oil passage 74 is transmitted to the hydraulic chamber 63 through the oil passages 119 and 141. In other words, a regulation of the primary regulator valve 56 is executed on the basis of the oil pressure from the oil passage 74 as the signal pressure. Furthermore, the action and the effect similar to those of the first embodiment to the fourth embodiment can be obtained by the constructions of the fifth embodiment similar to those of the first embodiment to the third embodiment.

Besides, in the fifth embodiment, the ports 153 and 157 are communicated each other in case the selector valve 144 is turned to ON state. Also, the ports 165 and 171 are communicated each other in case the selector valve 145 is turned to the ON state. In the fifth embodiment, moreover, both of the output oil pressures Psol2 of the linear solenoid valve SL2 and Psol1 of the linear solenoid valve SL1 are both controlled to high pressure level, and both of the selector valves 144 and 145 are turned to the ON state, as shown in the table of FIG. 8. In this connection, the oil of the oil passage 129 is fed to the brakes B1 and B2 through the oil passages 168 and 170. Therefore, an amount of lubricating oil for lubricating and cooling the brakes B1 and B2 can be increased, in spite of occurring of the slippage on the brakes B1 and B2 during the changing time from the Lo mode to the Hi mode, or from the Hi mode to the Lo mode.

Also, in the speed change modes other than the transient state from the Lo mode to the Hi mode, and the transient state from the Hi mode to the Lo mode, the selector valves 144 and 145 both are not turned to the ON state, and the lubricating oil is not fed to the brakes B1 and B2. Therefore, feeding of the lubricating oil fed to the brakes B1 can be suppressed so as not to exceed the required amount of the lubricating oil, in case the speed change modes other than the transient state from the Lo mode to the Hi mode, or the transient state from the Hi mode to the Lo mode are selected. Moreover, in case one of the brakes B1 and B2 is released, occurring of so-called "a brake and drag torque", in which the motive power of the rotary element is impaired by a viscosity resistance of the lubricating oil caused by feeding of the lubricating oil to released brake. In addition, the fuel consumption of the engine 1 can be improved by reducing the brake and drag torque.

A discharging amount of the oil pump can be also increased by using a motor driven type oil pump, a variable displacement pump or the like as the oil pump for feeding the oil to the hydraulic control apparatus 52, only in case of executing the speed change in the transmission 19. A time change of a pump flow of the case in which construction of this kind is employed, and the case in which the speed change is executed from the Lo mode to the Hi mode is shown in the time chart of FIG. 7. As shown in FIG. 7, it is controlled to increase the pump flow in a speed change preparation region and a speed change region, rather than the pump flow (i.e., discharging amount of the oil pumps 53 and 54) at before and after the speed change. A part of an increased pump flow is used for lubrication of the brakes B1 and B2.

Thus, a required amount of the oil in the hydraulic control apparatus 52 and the amount of the oil fed to the hydraulic control apparatus 52 can be balanced. Therefore, a discharging loss of the oil pump can be reduced and the fuel consumption of the engine 1 can also be improved, in case the speed change mode other than "in process of the speed change from the Lo mode to the Hi mode, or in process of the speed change from the Hi mode to the Lo mode" is selected. Besides, the corresponding relation between the constructions in the fifth embodiment and the construction of the present invention are similar to that between the constructions of the first to fourth embodiment and the construction of the present invention.

Here, although a planetary gear type transmission is employed as the transmission in the power train of FIG. 2, the present invention can also be applied to a vehicle having a selective gear type transmission. Also, the brake is exemplified as one kind of the frictional engagement device, and it is constructed to control the applying pressure of the brake by the hydraulic control apparatus; however, the present invention can also be applied to a vehicle having an electromagnetic clutch, and to a vehicle having an electromagnetic type actuator for controlling the gear ratio of the transmission. Moreover, the transmission shown in FIG. 2 is a discontinuous transmission capable of changing the gear ratio in a phased manner (i.e., discontinuously) between Low and High; however, the present invention can also be applied to a vehicle having a continuously variable transmission capable of changing the gear ratio steplessly (i.e., continuously). Furthermore, the present invention can also be applied to a FF (i.e., front engine and front drive) type vehicle in which a rotation axis of the engine and a motor generator is arranged in a width direction of the vehicle.

Here will be synthetically described the advantages to be obtained by this invention. According to the present invention, deterioration in the driving performance of the vehicle can be suppressed to achieve a limp home driving, even in case the function of the gear ratio control mechanism declines.

Also, according to the present invention, the gear ratio smaller than the maximum gear ratio can be set as the gear ratio of the transmission, in case the trouble such as the functional decline of the gear ratio control mechanism occurs. Therefore, rise in speed of the second prime mover can be suppressed.

Moreover, the second frictional engagement device is released when the first frictional engagement device is applied because of decline in function of the gear ratio control device, in case of setting the first gear ratio. Therefore, a situation in which the first and the second frictional engagement device are both applied at the same time can be avoided.

Still moreover, according to the present invention, any of the oil pressure regulated by the gear ratio control mechanism, and the control oil pressure generated by the control oil pressure generation valve, can be selected as the signal pressure of the control oil pressure generation valve.

And according to the present invention, the minimum required pressure can be generated in accordance with speed change situation of the transmission.

Moreover, according to the present invention, the signal pressure to be inputted into the control oil pressure generation valve can be controlled lower than the predetermined oil pressure, in case the transmission is made impossible to transmit the torque such as the neutral state. Therefore, the minimum pressure of the control oil pressure can be controlled generally constant, by an intrinsic mechanical characteristic of the control oil pressure generation valve.

Also, according to the present invention, in case the control oil pressure generated by the control oil pressure generation valve is lower than the predetermined oil pressure, engagement of the first or the second frictional engagement device can be achieved, by the oil pressure generated by reducing the low control oil pressure. Therefore, a shortage of the torque capacity of the first or the second frictional engagement device can be prevented from shortage.

Furthermore, according to the present invention, reduction in amount of the lubricating oil fed to the first and second frictional engagement device can be suppressed, in case of interchanging the first and second gear ratios in the transmission.

What is claimed is:

1. A control system for a hybrid vehicle, which has; a first prime mover (1) and a second prime mover (7) for transmitting a power to a wheel (31); a power distributor (10) for distributing the power of said first prime mover (1) to the wheel (31) and to a rotary device (6); a transmission (19) arranged on a power transmission route from said second prime mover (7) to the wheel (31); and a gear ratio controller (SL1, SL2) for controlling a gear ratio of the transmission (19), comprising:

a sub-controller (88, 120) for controlling a status of said transmission (19) to enable suppression of decline in a driving performance of the vehicle, even when the function of said gear ratio controller (SL1, SL2) declines.

2. A control system for a hybrid vehicle according to claim 1,
wherein said sub-controller (88, 120) has a function to set the gear ratio smaller than the maximum gear ratio, as the gear ratio of said transmission (19).

3. A control system for a hybrid vehicle according to claim 1,
wherein said transmission (19) has a first frictional engagement device (B1) and a second frictional engagement device (B2) applied/released by an oil pressure fed from said gear ratio controller (SL1, SL2);
wherein said gear ratio controller (SL1, SL2) has a first solenoid valve (SL1) for feeding/discharging the oil pressure to/from said first frictional engagement device (B1), and a second solenoid valve (SL2) for feeding/discharging the oil pressure to/from said second frictional engagement device (B2); and
wherein a low gear stage of a large gear ratio is set in said transmission (19) by releasing said first frictional engagement device (B1) and by applying said second frictional engagement device (B2), and a high gear stage of a small gear ratio is set in said transmission (19) by applying said first frictional engagement device (B1) and by releasing said second frictional engagement device (B2).

4. A control system for a hybrid vehicle according to claim 3,
wherein said first solenoid valve (SL1) includes a solenoid valve for outputting an apply pressure to said first frictional engagement device (B1) under an OFF state, and for draining the oil pressure from said first frictional engagement device (B1) under an ON state; and
wherein said second solenoid valve (SL2) includes a solenoid valve for draining the oil pressure from said second frictional engagement device (B1) under the OFF state, and for outputting the apply pressure to said second frictional engagement device (B2) under the ON state.

5. A control system for a hybrid vehicle according to claim 3,
wherein said sub-controller (88, 120) includes a valve (88, 120) for draining the oil pressure from said second frictional engagement device (B2), by operating the apply pressure of said first frictional engagement device (B1) as a signal pressure, regardless of an operating condition of said second solenoid valve (SL2).

6. A control system for a hybrid vehicle according to claim 1,
wherein said first prime mover (1) includes an internal combustion engine (1);
wherein said second prime mover (7) includes a motor generator (7);
wherein said rotary device (6) includes other motor generator (6);
wherein said power distributor (10) includes a planetary gear mechanism having, a sun gear (12) connected with said other motor generator (6), a ring gear (13) arranged concentrically with the sun gear (12) and connected with an output member (25), and a carrier (15) holding a pinion gear (14) meshing with the sun gear (12) and the ring gear (13) into which a torque of said internal combustion engine (1) is inputted, and;
wherein said output member (25) is connected with said transmission (19).

7. A control system for a hybrid vehicle according to claim 6,
wherein said transmission (19) has:
a first fixing element (28) in which its rotation is halted selectively by said first frictional engagement device (B1);
a second fixing element (21) in which its rotation is halted selectively by said second frictional engagement device (B2);
an input element (20) connected with said second prime mover (7), and
an output element (24) for transmitting the torque to said wheel (31); and
wherein said transmission (19) is constructed of a planetary gear mechanism for differential actions with three elements of the input element (20), the output element (31), and any of the fixing elements (28, 21).

8. A control system for a hybrid vehicle according to claim 7,
wherein said planetary gear mechanism includes a Ravigneaux type planetary gear mechanism.

9. A control system for a hybrid vehicle according to claim 1, further comprising:
a first frictional engagement device (B1) and a second frictional engagement device (B2) applied/released by the oil pressure transmitted thereto, in case a first or second gear ratio is set in said transmission (19);
a control oil pressure generation valve (56) for generating a predetermined control oil pressure in accordance with a signal pressure;
wherein said gear ratio controller (SL1, SL2) has a function to generate an oil pressure to be transmitted to said first frictional engagement device (B1) and second frictional engagement device (B2), by regulating the control oil pressure generated by said control oil pressure generation valve (56); and
a selector valve mechanism (101, 102, 132, 144, 145) for selecting the signal pressure from any of the control oil pressures, which is regulated by said gear ratio controller (SL1, SL2), and which is generated by said control oil pressure generation valve (56).

10. A control system for a hybrid vehicle according to claim 9,
wherein said selector valve mechanism (101, 102, 132, 144, 145) has:
a function to select the oil pressure to be transmitted to said second frictional engagement device (B2) as the signal pressure, in case of setting the first gear ratio by raising the oil pressure to be transmitted to said second frictional engagement device (B2) and by lowering the oil pressure to be transmitted to said first frictional engagement device (B1),
a function to select the oil pressure to be transmitted to said first frictional engagement device (B1) as the signal pressure, in case of setting the second gear ratio by raising the oil pressure to be transmitted to said first frictional engagement device (B1) and by lowering the oil pressure to be transmitted to said second frictional engagement device (B2), and
a function to select the control oil pressure generated by said control oil pressure generation valve (56) as the signal pressure, in case of interchanging between said first and second gear ratio.

11. A control system for a hybrid vehicle according to claim 3, further comprising:
a control oil generation valve (56) for generating the control oil pressure in accordance with a signal pressure, and for feeding a generated control oil pressure to each of said solenoid valve (SL1, SL2), and
a selector valve mechanism (101, 102, 132, 144, 145) for selecting any of the oil pressures which is outputted by said first solenoid valve (SL1) and which is outputted by said second solenoid valve (SL2) as the signal pressure, and for feeding a selected oil pressure to said control oil pressure generation valve (56).

12. A control system for a hybrid vehicle according to claim 11,
wherein said selector valve mechanism (101, 102, 132, 144, 145) includes:
a first selector valve (101, 104) for outputting the oil pressures outputted from said first solenoid valve (SL1) and outputted from said control oil pressure generation valve (56) in case said first solenoid valve (SL1) is outputting the oil pressure, and for outputting the oil pressure outputted from the second solenoid valve (SL2), in case said first solenoid valve (SL1) is not outputting the oil pressure; and
a second selector valve (102, 132, 145) for outputting the output oil pressure of said second solenoid valve (SL2) outputted from said first selector valve (101, 104) as said signal pressure in case said second solenoid valve (SL2) is outputting the oil pressure, and for outputting the output oil pressure of said first solenoid valve (SL1) or of said control oil pressure generation valve (56) outputted from said first selector valve (101, 104) as said signal pressure in case said second solenoid valve (SL2) is not outputting the oil pressure.

13. A control system for a hybrid vehicle according to claim 9,
wherein said selector valve mechanism (101, 102, 132, 144, 145) is constructed to control the signal pressure to be inputted to said control oil pressure generation valve (56) lower than a predetermined oil pressure, in case said transmission (19) is controlled impossible to transmit the torque.

14. A control system for a hybrid vehicle according to claim 12,
wherein said first selector valve (101, 144) has a port (130, 150) for communicating an oil passage (117, 141) for feeding said signal pressure to said control oil pressure generation valve (56) with a drain, in case each of said solenoid valve (SL1, SL2) is not outputting the oil pressure.

15. A control system for a hybrid vehicle according to claim 9,
wherein said selector valve mechanism (101, 102, 132, 144, 145) hass an oil passage (142, 143) for outputting the signal pressure as the apply pressure to said first frictional engagement device (B1) or to said second functional engagement device (B2), in case of outputting the oil pressure outputted from said gear ratio controller (SL1, SL2) as said signal pressure.

16. A control system for a hybrid vehicle according to claim 11,
wherein said selector valve mechanism (101, 102, 132, 144, 145) has:
an oil passage (143) for outputting the signal pressure as the apply pressure to said first frictional engagement device (B1), in case of outputting the output oil pressure of said first solenoid valve (SL1) as said signal pressure; and
an oil passage (142) for outputting the signal pressure as the apply pressure to said second frictional engagement device (B2), in case of outputting the output oil pressure of said second solenoid valve (SL2) as said signal pressure.

17. A control system for a hybrid vehicle according to claim 12,
wherein said first selector valve (101, 144) has a port (108, 156) for outputting the oil pressure outputted from said first solenoid valve (SL1), to said second selector valve (102, 132, 145) and to said first frictional engagement device (B1); and
wherein said second selector valve (102, 132, 145) has a port (153, 157, 168, 171, 170) for outputting the oil pressure outputted from said second solenoid valve (SL2) and inputted through said first selector valve (101, 144), to said control oil pressure generation valve (56) as said signal pressure, and to said second frictional engagement device (B2) as the apply pressure.

18. A control system for a hybrid vehicle according to claim 9,
wherein said selector valve mechanism (101, 102, 132, 144, 145) has an oil passage (153, 157, 168, 171, 170) for feeding a lubricating oil to each frictional engagement device (B1, B2), in the transient state of interchanging apply/release state of said first frictional engagement device (B1) and said second frictional engagement device (B2).

19. A control system for a hybrid vehicle according to claim 11,
wherein said selector valve mechanism (101, 102, 132, 144, 145) has an oil passage (153, 157, 168, 171, 170) for feeding lubricating oil to at least any of said first frictional engagement device (B1) and said second frictional engagement device (B2), in case both of the oil pressures outputted from said first solenoid valve (SL1) and outputted from said second solenoid valve (SL2) exceeds predetermined value.

20. A control system for a hybrid vehicle according to claim 12,
wherein said selector valve (144) has a port (157) for outputting a lubricating oil to said second selector valve (145), with outputting the oil pressure outputted form said first solenoid valve (SL1); and
wherein said second selector valve (145) has an oil passage (170) for feeding the lubricating oil fed from said first selector valve (144), to at least any one of said first frictional engagement device (B1) and said second frictional engagement device (B2), when said second selector valve (145) is outputting the oil pressure outputted form said second solenoid valve (SL2).

* * * * *